United States Patent
Han et al.

(10) Patent No.: US 10,122,409 B2
(45) Date of Patent: Nov. 6, 2018

(54) SYSTEMS AND METHODS FOR TIME-REVERSAL DIVISION MULTIPLE ACCESS WIRELESS BROADBAND COMMUNICATIONS

(71) Applicant: UNIVERSITY OF MARYLAND AT COLLEGE PARK, College Park, MD (US)

(72) Inventors: Feng Han, San Diego, CA (US); Yu-Han Yang, College Park, MD (US); Beibei Wang, Bridgewater, NJ (US); Yongle Wu, San Diego, CA (US); K. J. Ray Liu, Potomac, MD (US)

(73) Assignee: UNIVERSITY OF MARYLAND AT COLLEGE PARK, College Park, MD (US)

( * ) Notice: Subject to any disclaimer, the term of this patent is extended or adjusted under 35 U.S.C. 154(b) by 0 days.

(21) Appl. No.: 14/095,503

(22) Filed: Dec. 3, 2013

(65) Prior Publication Data
US 2014/0185596 A1    Jul. 3, 2014

Related U.S. Application Data

(60) Provisional application No. 61/732,612, filed on Dec. 3, 2012.

(51) Int. Cl.
| H04B 7/06 | (2006.01) |
| H04B 1/7163 | (2011.01) |
| H04B 7/04 | (2017.01) |

(52) U.S. Cl.
CPC ............. *H04B 1/7163* (2013.01); *H04B 7/04* (2013.01)

(58) Field of Classification Search
CPC ............ H04B 1/7163; H04B 7/04; H04L 5/00
(Continued)

(56) References Cited

U.S. PATENT DOCUMENTS

| 2,933,702 A | 4/1960 | Bogert |
| 3,767,855 A | 10/1973 | Ueno et al. |

(Continued)

FOREIGN PATENT DOCUMENTS

| EP | 2 571 214 A1 | 11/2012 |
| WO | WO 2007/031088 | 3/2007 |

(Continued)

OTHER PUBLICATIONS

Emami et. al. "Matched Filtering with Rate Back-off for Low Complexity Communications in Very Large Delay Spread Channels," 2004, Signals, Systems and Computers, 2004. Conference Record of the Thirty-Eighth Asilomar Conference on, 2004, pp. 218-222 vol. 1.*

(Continued)

*Primary Examiner* — Mark H Rinehart
*Assistant Examiner* — Kenneth P Hunt
(74) *Attorney, Agent, or Firm* — Sughrue Mion, PLLC

(57) ABSTRACT

There is provided a communication system including a transmitting section and a receiving section which includes a plurality of receivers. The transmitting section includes a communication unit which receives a plurality of signals respectively from the plurality of receivers, and stores a plurality of time-reversed signals corresponding to the received plurality of signals with respect to the plurality of receivers, and a first conversion unit which converts, by a first factor, a plurality of information sequences to be respectively transmitted to the plurality of receivers and forward the plurality of converted information sequences to the communication unit. The communication unit generates, based on the plurality of converted information sequences, a plurality of output signals to be respectively transmitted to the plurality of receivers, each of the plurality of the output (Continued)

signals including a location-specific signature unique to the corresponding receiver.

20 Claims, 10 Drawing Sheets

(58) Field of Classification Search
USPC ......................................................... 370/337
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,499,394 | A * | 3/1996 | Kaatz ...................... H03J 5/242 455/266 |
| 5,926,768 | A * | 7/1999 | Lewiner ................. H04B 7/005 455/506 |
| 6,301,291 | B1 | 10/2001 | Rouphael et al. |
| 6,490,469 | B2 | 12/2002 | Candy |
| 7,280,469 | B2 * | 10/2007 | Jin ........................ G06F 17/142 370/210 |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 * | 6/2012 | Zhang ................. H04W 52/225 455/127.2 |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 2006/0098746 | A1 * | 5/2006 | Candy ................. H04L 25/0212 375/259 |
| 2006/0193410 | A1 * | 8/2006 | Moorti .................. H04W 52/52 375/347 |
| 2010/0085902 | A1 * | 4/2010 | Phan Huy ........... H04L 25/0212 370/280 |
| 2010/0302977 | A1 | 12/2010 | Huy et al. |
| 2010/0309829 | A1 | 12/2010 | Huy et al. |
| 2011/0176435 | A1 * | 7/2011 | Khandekar ............... H04L 5/16 370/252 |
| 2012/0257660 | A1 * | 10/2012 | Smith ...................... H04B 7/24 375/224 |
| 2012/0263056 | A1 | 10/2012 | Smith et al. |
| 2012/0328037 | A1 | 12/2012 | Hsu et al. |
| 2013/0070814 | A1 * | 3/2013 | Lu ....................... H04L 25/0226 375/219 |
| 2013/0201958 | A1 | 8/2013 | Huy et al. |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1 | 7/2014 | Han et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Blomgren et. al. "Spatial Focusing and Intersymbol Interference in Multiple-Input—Single-Output Time Reversal Communication Systems" Jul. 2008, IEEE Journal of Oceanic Engineering, vol. 33, No. 3, pp. 341-355.*

Han et. al. "Time-Reversal Division Multiple Access over Multi-Path Channels," Jul. 2012, IEEE Transactions on Communications, vol. 60, No. 7, pp. 1953-1965.*

Guo et. al. "UWB MISO Time Reversal with Energy Detector Receiver over ISI Channels," 2007, 2007 4th IEEE Consumer Communications and Networking Conference, Las Vegas, NV, USA, 2007, pp. 629-633.*

Yang et. al. "Waveform Design for Sum Rate Optimization in Time-Reversal Multiuser Downlink Systems," 2011, Global Telecommunications Conference (GLOBECOM 2011), 2011 IEEE, Houston, TX, USA, 2011, pp. 1-5.*

Zhou et. al. "Spatial Focusing and Interference Reduction using MISO Time Reversal in an Indoor Application" 2007,2007 IEEE/SP 14th Workshop on Statistical Signal Processing, Madison, WI, USA, 2007, pp. 307-311.*

Blomgren et. al. "Spatial Focusing and Intersymbol Interference in Multiple-Input-Single-Output Time Reversal Communication Systems" Jul. 2008, IEEE Journal of Oceanic Engineering, vol. 33, No. 3, pp. 341-355.*

S. S. Mo, N. Guo, J. Q. Zhang and R. C. Qiu, "UWB MISO Time Reversal With Energy Detector Receiver Over ISI Channels," 2007 4th IEEE Consumer Communications and Networking Conference, Las Vegas, NV, USA, 2007, pp. 629-633. doi: 10.1109/CCNC.2007.129.*

Wikipedia "Multiplexing" Oct. 11, 2016 https://en.wikipedia.org/wiki/Multiplexing.*

Wang et. al. "Green Wireless Communications: A Time-Reversal Paradigm" Sep. 2011, IEEE Journal on Selected Areas in Communications, vol. 29, No. 8, pp. 1698-1710.*

D. Abbasi-Moghadam and V.T. Vakili, "A SIMO one-bit time reversal for UWB communication systems", EURASIP J. Wireless Comm. and Networking, 2012:113, 2012.

D. Albert, L. Liu, M. L. Moran, "Time Reversal processing for source location in an urban environment (L)", J. Acoust. Soc. Am., vol. 118, No. 2, pp. 616-619, Aug. 2005.

A.P. Brysev, L.M. Krutyanskii, V'L. Preobrazhenskii, "Wave Phase Conjugation in ultrasonic beams", Physics-Uspekhi, vol. 41, No. 8, pp. 793-805, 1998.

Y.H. Chang, S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Y. Chen, F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Chen, Y. et al., "Time-reversal wideband communications," IEEE Signal Processing Letters, vol. 20(12):1219-1222 (Dec. 2013).

R. C. Daniels and R. W. Heath, "Improving on time-reversal with MISO precoding," in the Proceedings IWC/WPMC, Aalborg, Denmark, Sep. 2005.

R. C. Daniels and R. W. Heath, "MISO precoding for temporal and spatial focusing" in the Proceedings of the Eighth International Symposium on Wireless Personal Communications Conference, Aalborg, Denmark, 2005.

G.F. Edelmann, T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

S.M. Emami, J. Hansen, A.D. Kim, G. Papanicolaou, A.J. Paulraj, D. Cheung, C. Prettie, "Predicted Time Reversal Performance in Wireless Communications using Channel Measurements", publication details unknown.

R.J. Fontana, S.J. Gunderson, "Ultra-Wideband Precision Asset Location System", Proc. of the IEEE Conf. on UWB Sys. and Tech., pp. 147-150, 2002.

(56) References Cited

OTHER PUBLICATIONS

F. Han, "Energy Efficient Optimization in Green Wireless Networks", University of Maryland Ph. D. Dissertation, 2013.
G. Lerosey, J. de Rosny, A. Tourin, A. Derode, M. Fink, "Time Reversal of Wideband Microwaves", Appl. Phys. Lett., vol. 88, 154101, Apr. 2006.
A.Derode, A. Tourin, and M. Fink, "Ultrasonic pulse compression with one-bit time reversal through multiple scattering", J. Appl. Phys., vol. 85, No. 9, pp. 6343-6352, May 1999.
M. Fink and C. Prada, "Acoustic Time-Reversal Mirrors", Inverse Problems, vol. 17, pp. R1-R38, 2001.
C. Prada, F. Wu, and M. Fink, "The iterative time reversal mirror: A solution to self-focusing in the pulse echo mode," J. Acoustic Society of America, vol. 90, pp. 1119-1129, 1991.
C. Dorme and M. Fink, "Focusing in transmit-receive mode through inhomogeneous media: The time reversal matched filter approach", J. Acoust. Soc. Am., vol. 98, Pt. 1, pp. 1155-1162, Aug. 1995.
I.H. Naqvi, G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
A. Derode, P. Roux, and M. Fink, "Robust Acoustic Time Reversal and High-Order Multiple Scattering", Phys. Rev. Lett., vol. 75, No. 23, pp. 4206-4210, Dec. 1995.
A.Derode, A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.
G. Lerosey, J. de Rosny, A. Tourin, A. Derode, G. Montaldo and M. Fink, "Time Reversal of Electromagnetic Waves", Phys. Rev. Lett., vol. 92, No. 19, 193904, May 2004.
F. Lemoult, G. Lerosey, J. de Rosny, and M. Fink, "Manipulating Spatiotemporal Degrees of Freedom in Waves of Random Media", Phys. Rev. Lett., vol. 103, 173902, Oct. 2009.
F. Lemoult, G. Lerosey, J. de Rosny, and M. Fink, "Resonant Metalenses for Breaking the Diffraction Barrier", Phys. Rev. Lett., vol. 104, 203901, May 2010.
G. Lerosey, J. de Rosny, A. Tourin, A. Derode, G. Montaldo and M. Fink, "Time Reversal of Electromagnetic Waves and Telecommunication", Radio Science, vol. 40, RS6S12, 2005.
G. Lerosey, J. de Rosny, A. Tourin, and M. Fink, "Focusing beyond the diffraction limit with far-field time reversal", Science, vol. 315, pp. 1120-1122, Feb. 2007.
J. de Rosny, G. Lerosey and M. Fink, "Theory of Electromagnetic Time-Reversal Mirrors", IEEE Trans. Antennas Propag., vol. 58, No. 10, pp. 3139-3149, Oct. 2010.
M. Fink, "Time Reversal of Ultrasonic Fields—Part I: Basic Principals", IEEE Trans. Ultrasonics, Ferroelectrics and Freq. Contr., vol. 39, No. 5, pp. 555-566, Sep. 1992.
F. Wu, J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.
M. Fink, C. Prada, F. Wu, and D. Cassereau, "Self focusing in inhomogeneous media with time reversal acoustic mirrors," IEEE Ultrasonics Symposium, vol. 1, pp. 681-686, 1989.
G. Montaldo, G. Lerosey, A. Derode, A. Tourin, J. de Rosny, and M. Fink, "Telecommunication in a disordered environment with iterative time reversal," Waves Random Media, vol. 14, pp. 287-302, May 2004.
M. Fink, "Time-Reversal Mirrors", J. Phys. D: Appl. Phys., vol. 26, pp. 1333-1350, 1993.
M. Fink, "Time-Reversed Acoustics", Scientific American, pp. 91-97, Nov. 1999.
F. Han, Y.H. Yang, B. Wang, Y. Wu, K.J.R. Liu, "Time-reversal division multiple access in multi-path channels," Global Telecommunications Conference, pp. 1-5 (2011).
F. Han and K.J.R. Liu, "An Interference Cancellation Scheme for the Multiuser TRDMA Uplink System," Global Telecommunications Conference, pp. 3583-3588 (2013).

F. Han, Y.H. Yang, B. Wang, Y. Wu, K.J.R. Liu, "Time-reversal division multiple access over multi-path channels," IEEE Transactions on Communications, vol. 60(7):1953-1965 (Jul. 2012).
F. Han and K.J.R. Liu, "A multiuser TRDMA uplink system with 2D parallel interference cancellation," IEEE Transactions on Communications, vol. 62(3):1011-1022 (Mar. 2014).
B.E. Henty and D.D. Stancil, "Multipath-Enabled Super-Resolution for rf and Microwave Communication using Phase-Conjugate Arrays", Phys. Rev. Lett., vol. 93, 243904, Dec. 2004.
A.Khalegi, G. El Zein and I. Navqi, "Demonstration of Time-Reversal in Indoor Ultra-Wideband Communication: Time Domain Measurement", IEEE Proc. of ISWCS, pp. 465-468, 2007.
W.A. Kuperman, W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
P. Kyritsi and G. Papanicolau, "One-bit Time Reversal for WLAN Applications", IEEE 16th Intern. Symp. on Personal, Indoor and Mobile Radio Comm., pp. 532-536, 2005.
Lienard, M. et al., "Focusing gain model of time-reversed signals in dense multipath channels", IEEE Antennas and Wireless Propagation Letters, vol. 11:1064-1067 ( 2012).
H. Ma, F. Han, and K.J.R. Liu, "Interference-Mitigating Broadband Secondary User Downlink System: A Time-Reversal Solution", Global Telecommunications Conference, pp. 884-889, (2013).
Jin, Yuanwei et al., "Adaptive time reversal beamforming in dense multipath communication networks," 2008 42nd Asilomar Conference on Signals, Systems and Computers, pp. 2027-2031 (Oct. 2008).
J.M.F. Moura and Y. Jin, "Detection by Time Reversal: Single Antenna", IEEE Trans. on Signal Process., vol. 55, No. 1, Jan. 2007.
J.M.F. Moura and Y. Jin, "Time Reversal Imaging by Adaptive Interference Canceling", IEEE Trans. on Signal Process., vol. 56, No. 1, Jan. 2008.
J.Y. Jin and .M.F. Moura, "Time Reversal Detection Using Antenna Arrays", IEEE Trans. on Signal Process., vol. 57, No. 4, Apr. 2009.
I.H. Naqvi, P. Besnier and G. El Zein, "Effects of Time Variant Channel on a Time Reversal UWB System", Global Telecommunications Conference, (2009).
I.H. Naqvi, A. Khaleghi and G. El Zein, "Performance Enhancement of Multiuser Time Reversal UWB Communication System", Proc. of IEEE ISWCS, pp. 567-571, 2007.
H.T. Nguyen, "Partial one bit time reversal for UWB impulse radio multi-user communications", IEEE Proc. of ICCE, 2008.
T.K. Nguyen, H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
H. Nguyen, Z. Zhao, F. Zheng and T. Kaiser, "On the MSI Mitigation for MIMO UWB Time Reversal Systems", Proc. of IEEE International Conference on Ultra-Wideband, pp. 295-299, 2009.
T.K. Nguyen, H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, H. T. et al., "A time reversal transmission approach for multiuser UWB communications," IEEE Transactions on Antennas and Propagation, vol. 54: 3216-3224 (Nov. 2006).
H. Nguyen, Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.
H. Nguyen, F. Zheng, and T. Kaiser, "Antenna Selection for Time Reversal MIMO UWB Systems", IEEE Vehicle Technology Conference, pp. 1-5, 2009.

(56) References Cited

OTHER PUBLICATIONS

H.T. Nguyen, "On the performance of one bit time reversal for multi-user wireless communications", IEEE Proc. of ISWCS, pp. 672-676, 2007.

C. Oestges, A.D. Kim, G. Papanicolaou, and A.J. Paulraj, "Characterization of Space-Time Focusing in Time Reversed Fields", IEEE Trans. Antennas and Propag., pp. 1-9, 2005.

A.Parvulescu and C.S. Clay, "Reproducibility of Signal Transmissions in the Ocean", The Radio and Electronic Engineer, pp. 223-228, Apr. 1965.

D.T. Phan-Huy, S.B. Halima, M. Helard, "Frequency Division Duplex Time Reversal", Global Telecommunications Conference, (2011).

D. Porcino, "Ultra-Wideband Radio Technology: Potential and Challenges Ahead", IEEE Communications Mag., pp. 66-74, Jul. 2003.

Qiu, R. C. et al., "Time reversal with miso for ultra-wideband communications: Experimental results," IEEE Antenna and Wireless Propagation Letters, vol. 5:269-273 (2006).

N. Guo, B.M. Sadler and R.C. Qiu, "Reduced-Complexity UWB Time-Reversal Techniques and Experimental Results", IEEE Trans. on Wireless Comm., vol. 6, No. 12, Dec. 2007.

D. Rouseff, D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J Oceanic Eng., vol. 26, No. 4, pp. 821-831, Oct. 2001.

H. Saghir, M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

H.C. Song, W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

H.C. Song, W.S. Hodgkiss, W.A. Kuperman, T. Akal, and M. Stevenson, "Multiuser Communications Using Passive Time Reversal", IEEE J Oceanic Eng., vol. 32, No. 4, pp. 915-926, Oct. 2007.

T. Strohmer, M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Wang, B. et al., "Green wireless communications: A time-reversal paradigm," IEEE Journal of Selected Areas in Communications, vol. 29:1698-1710 (2011).

S.Q. Xiao, J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Yu-Han et al., "Near-optimal waveform design for sum rate optimization in time-reversal multiuser downlink systems," vol. 12(1):346-357 (Jan. 2013).

Y.H. Yang, B. Wang and K.J.R. Liu, "Waveform Design for Sum Rate Optimization in Time-Reversal Multiuser Downlink Systems", Global Telecommunications Conference, (2011).

X. Zhou, P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

J.P. Rode, M.J. Hsu, D. Smith and A. Hussain, "Collaborative Beamfocusing Radio (COBRA)", Proc. of SPIE, vol. 8753, pp. 87530J-1-11, 2013.

Y.H. Yang, "Waveform Design and Network Selection in Wideband Small Cell Networks", University of Maryland Ph. D. Thesis, 2013.

* cited by examiner

Two-User TRDMA with one Single Antenna (a)

Two-User Rake Receivers with one Single Antenna (b)

SYSTEMS AND METHODS FOR TIME-REVERSAL DIVISION MULTIPLE ACCESS WIRELESS BROADBAND COMMUNICATIONS

CROSS REFERENCE TO RELATED APPLICATIONS

This application claims priority from U.S. Provisional Application No. 61/732,612 filed Dec. 3, 2012, the disclosure of which is incorporated herein by reference.

BACKGROUND

Field

Systems, apparatuses, articles of manufacture, and methods consistent with the present disclosure relate to broadband communications, and more particularly, to time-reversal division multiple access wireless broadband communications.

Description of the Related Art

Recently, e.g., in the past decade, an unprecedented increase of demand for high speed wireless services has been witnessed, which necessitates the need for future broadband communications. When it comes to broadband, the resolution of perceiving multiple paths increases accordingly. In a rich scattering environment, the adverse multi-path effect makes related art high-speed communications a very challenging task due to the severe inter-symbol interference (ISI). To resolve this problem, multi-carrier modulation (e.g. OFDM) and/or complicated equalization are needed at the receiver to alleviate the ISI. However, this often results in a prohibitively high complexity for end-user equipment and wireless terminals in many applications.

SUMMARY

On the other hand, the time-reversal (TR) signal transmission technique can provide a great potential of low complexity energy-efficient communications, which can make full use of the nature of multi-path environments. The history of research on time-reversal transmission technology dates back to early 1990's; however, not much development and interest went beyond the acoustics and ultrasound domains at that time. As found in acoustic physics and then further validated in practical underwater propagation environments, the energy of the TR acoustic waves from transmitters could be refocused primarily at the intended location with very high spatial resolution (several-wavelength level). Since TR can make full use of multi-path propagation and also requires no complicated channel processing and equalization, it has been verified and tested in wireless radio communication systems, e.g., in Ultra-wideband (UWB) systems.

The single-user TR wireless communications includes two phases: the recording phase and the transmission phase. When transceiver A wants to transmit information to transceiver B, transceiver B first sends an impulse that propagates through a scattering multi-path environment and the multi-path signals are received and recorded by transceiver A; then, transceiver A simply transmits the time-reversed (and conjugated) waves back through the communication link to transceiver B. By utilizing channel reciprocity, the TR waves can retrace the incoming paths, ending up with a "spiky" signal-power spatial distribution focused primarily at the intended location, commonly referred to as the spatial focusing effect.

Also, from a signal processing point of view, in single-user communications, TR essentially leverages the multi-path channel as a facilitating matched filter computing machine for the intended receiver, and concentrates the signal energy in the time domain as well, as commonly referred to as temporal focusing effect. It is worth noting that when the channel coherent time is not very small, the transmission phase of a duty cycle can include multiple transmissions of signals without having to probe the channel before each transmission, which can reasonably maintain the bandwidth efficiency. This is typically the case when TR is used, and has been verified by real-life experiments.

In the single-user case, the temporal and spatial focusing effects have been shown to greatly simplify the receiver, and reduce power consumption and interference while maintaining the quality of service (QoS).

One or more exemplary embodiments provide a multi-user downlink system over multi-path channels, implementing time-reversal division multiple access (TRDMA) as a wireless channel access method by taking advantage of the high-resolution spatial focusing effect of time-reversal structure. The mechanisms of reflection, diffraction and scattering in wireless medium give rise to the uniqueness and independence of the multi-path propagation profile of each communication link, which are exploited by the exemplary embodiments to provide spatial selectivity in spatial division multiple access (SDMA) schemes.

Compared with related art antenna-array based beamforming SDMA schemes, the time-reversal technique(s) disclosed in the present application makes full use of a large number of multi-paths and in essence treats each path as a virtual antenna that naturally exists and is widely distributed in environments.

Thus, with even just one single transmit antenna, time reversal as implemented in the present application can achieve a very high diversity gain and high-resolution "pin-point" spatial focusing.

The high-resolution spatial focusing effect maps the natural multi-path propagation profile into a unique location-specific signature for each link, analogous to the artificial "orthogonal random code" in a code-division system. The disclosed TRDMA scheme exploits the uniqueness and independence of location-specific signatures in multi-path environment, providing a novel low-cost energy-efficient solution for SDMA. Better yet, the TRDMA scheme accomplishes much higher spatial resolution focusing/selectivity and time-domain signal-energy compression at once, without requiring further equalization at the receiver as the antenna-array based beamforming does.

The potential and feasibility of applying time reversal to multi-user UWB communications were validated by some real-life antenna-and-propagation experiments in which the signal transmit power reduction and inter-user interference alleviation as a result of spatial focusing effect were tested and justified for a simplified one-shot transmission over deterministic multi-path ultra-wideband channels.

Implementation of TRDMA has been investigated and supported recently. For example, a TR-based single-user spatial multiplexing scheme has been introduced for SIMO UWB system, in which multiple data streams are transmitted through one transmit antenna and received by a multi-antenna receiver. Solid simulation results regarding bit-error-ratio (BER) demonstrated the feasibility of applying TR to spatially multiplex data streams. Also, the spatial correlation between antennas of the single receiver has been taken into account and numerically investigated through computer simulation its impact to BER performance. Further, a multiuser UWB scenario has been tacked with a focus on the impact of channel correlation to the BER performance through simulation.

However, there is not much theoretical characterization or proof about system performances in the related art. Furthermore, most of the related art focuses on BER performances, without looking at the spectral efficiency which is one of the main design purposes for any spatial multiplexing scheme. As such, there is still a lack of system-level theoretical investigation and comprehensive performance analysis of a TR-based multi-user communications system in the related art.

At least in part motivated by the high-resolution spatial focusing potential of the time-reversal structure, several major developments have been disclosed herein with respect to exemplary TRDMA multi-user communications systems. Specifically:

We disclose the concept of TRDMA as a novel multi-user downlink solution for wireless multi-path environments, and developed a theoretical analysis framework for the disclosed scheme.

We disclose a multi-user broadband communication system over multi-path Rayleigh fading channels, in which the signals of multiple users are separated solely by TRDMA.

We define and evaluate a number of system performance metrics, including the effective signal-to-interference-plus-noise ratio (SINR) at each user, achievable sum rate, and achievable rate with ε-outage.

We further investigate the achievable rate region for a simplified two-user case, from which one can see the advantages of the disclosed TRDMA techniques over its counterpart techniques, due to TR's spatial focusing effect.

We incorporate and examine quantitatively the impact of spatial correlation of users to system performances for the single-input-single-output (SISO) case to gain more comprehensive understanding of TRDMA.

According to an aspect of an exemplary embodiment, there is provided a communication system including a transmitting section and a receiving section including a plurality of receivers, wherein the transmitting section includes a communication unit configured to receive a plurality of signals respectively from the plurality of receivers of the receiving section, and store a plurality of time-reversed signals corresponding to the received plurality of signals with respect to the plurality of receivers, and a first conversion unit configured to convert, by a first factor, a plurality of information sequences to be respectively transmitted to the plurality of receivers and forward the plurality of converted information sequences to the communication unit, wherein the communication unit is configured to generate, based on the plurality of converted information sequences, a plurality of output signals to be respectively transmitted to the plurality of receivers, each of the plurality of the output signals including a location-specific signature unique to the corresponding receiver, wherein each of the plurality of receivers of the receiving section include an adjustment unit configured to perform a gain adjustment, in response to receiving the respective output signal, to the output signal, and a second conversion unit configured to convert, by the first factor, the gain-adjusted output signal thereby generating a version of the respective information sequence transmitted from the transmitting section to the receiver.

The communication unit may be configured to convolve the converted information sequence of the respective receiver and the time-reversed signal of the respective receiver to obtain the respective output signal, and add the plurality of output signals to be respectively transmitted to the plurality of receivers as a combined output signal to be transmitted.

The communication system may be a time-reversal division multiple access (TRDMA) communication system.

The communication unit may be a time-reversal mirror configured to receive, as the signals, a plurality of impulse signals respectively from the plurality of receivers of the receiving section, record a plurality of channel responses of the received plurality of impulse signals with respect to the plurality of receivers, and store a plurality of time-reversed versions of the plurality of channel responses as the plurality of time-reversed signals corresponding to the received plurality of impulse signals with respect to the plurality of receivers.

The first conversion unit may be configured to convert the plurality of information sequences by up-sampling the plurality of information sequences by the first factor, and the second conversion unit may be configured to convert the gain-adjusted output signal by down-sampling the gain-adjusted output signal by the first factor.

According to an aspect of another exemplary embodiment, there is provided a transmission system including a communication unit configured to receive a plurality of signals respectively from a plurality of receivers, and store a plurality of time-reversed signals corresponding to the received plurality of signals with respect to the plurality of receivers, and a conversion unit configured to convert, by a first factor, a plurality of information sequences to be respectively transmitted to the plurality of receivers and forward the converted plurality of information sequences to the communication unit, wherein the communication unit is configured to generate, based on the plurality of converted information sequences, a plurality of output signals to be respectively transmitted to the plurality of receivers, each of the plurality of the output signals including a location-specific signature unique to the corresponding receiver.

According to an aspect of another exemplary embodiment, there is provided a transmission method including storing a plurality of time-reversed signals corresponding to a plurality of signals respectively received from a plurality of receivers, converting, by a first factor, a plurality of information sequences to be respectively transmitted to the plurality of receivers, and generating, based on the plurality of converted information sequences, a plurality of output signals to be respectively transmitted to the plurality of receivers, each of the plurality of the output signals including a location-specific signature unique to the corresponding receiver.

According to an aspect of another exemplary embodiment, there is provided a non-transitory computer-readable medium storing a program to execute functions of a transmission method, the functions including storing a plurality of time-reversed signals corresponding to a plurality of signals respectively received from a plurality of receivers, converting, by a first factor, a plurality of information sequences to be respectively transmitted to the plurality of receivers, and generating, based on the plurality of converted information sequences, a plurality of output signals to be respectively transmitted to the plurality of receivers, each of the plurality of the output signals including a location-specific signature unique to the corresponding receiver.

BRIEF DESCRIPTION OF THE DRAWINGS

These above and/or other aspects will become apparent and more readily appreciated from the following description of exemplary embodiments, taken in conjunction with the accompanying drawings of which:

FIG. 10(a) shows an exemplary two-user single-antenna TRDMA system as described, e.g., with reference to FIG. 1.

DETAILED DESCRIPTION

I. Introduction

Figure 1:
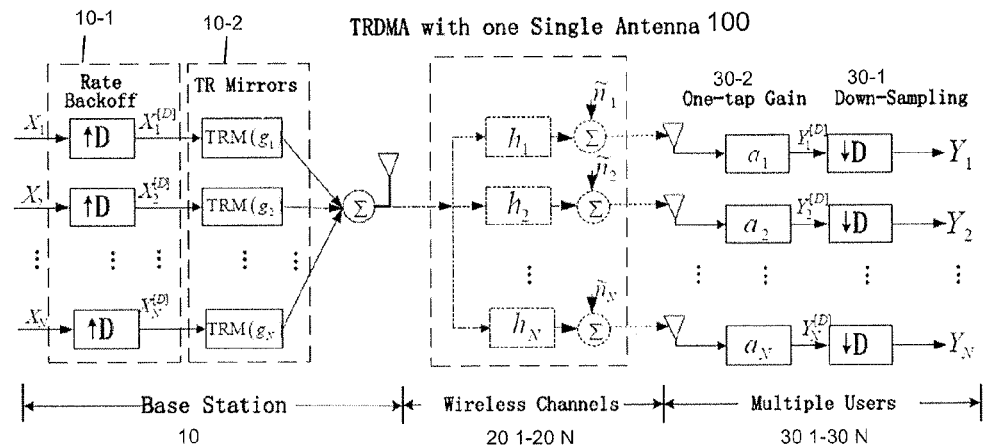
FIG. 1 shows a block diagram of a SISO TRDMA downlink system according to an exemplary embodiment.

Reference will now be made in detail to exemplary embodiments of the present general inventive concept, examples of which are illustrated in the accompanying drawings, wherein like reference numerals refer to the like elements throughout. The exemplary embodiments are described below to explain the present general inventive concept by referring to the figures.

Figure 2:
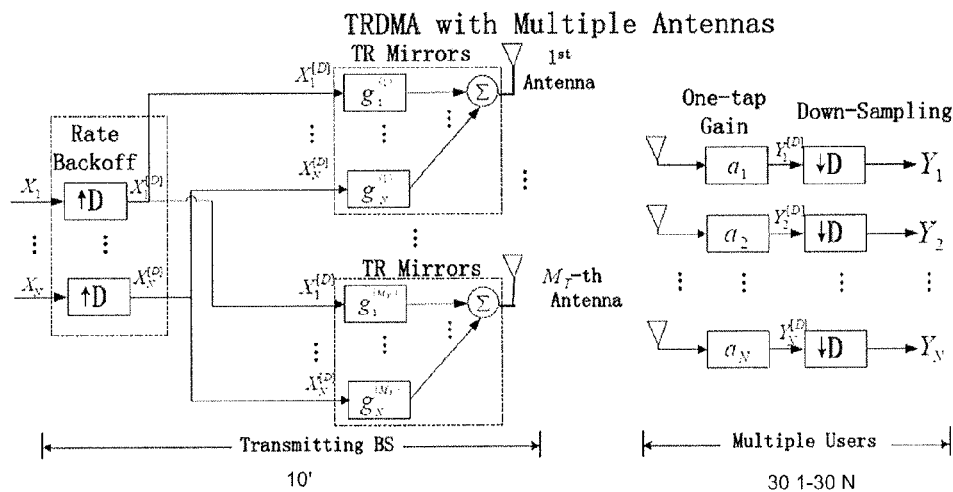
FIG. 2 shows a block diagram of a multiple-input-single-output (MISO) TRDMA downlink system according to an exemplary embodiment.
Figure 7:
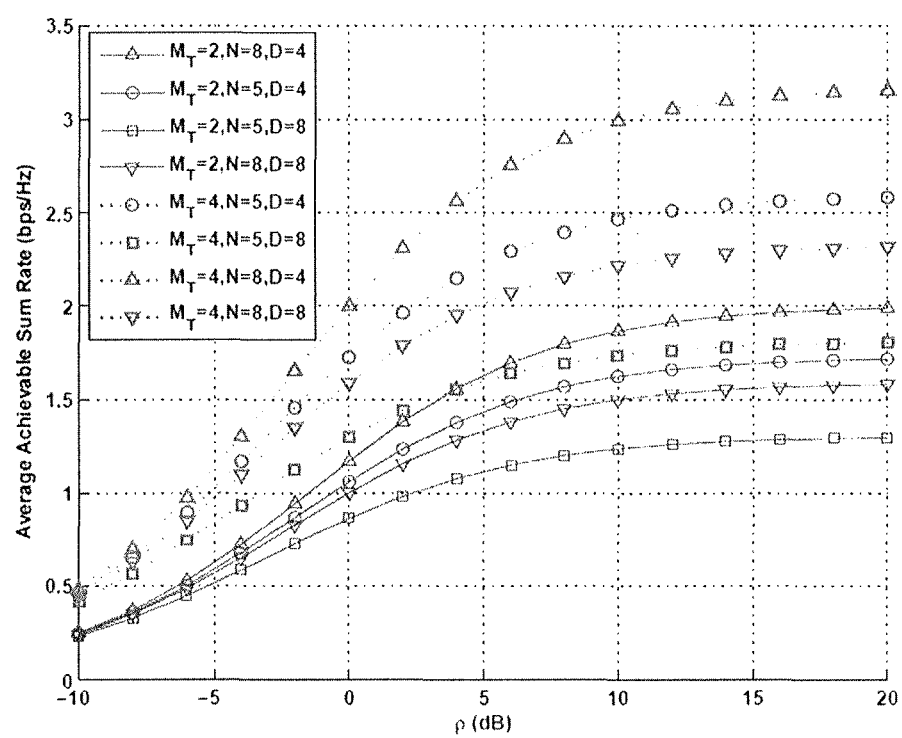
FIG. 7 illustrates the average achievable sum rate with different configurations of the exemplary TRDMA downlink system.
Figure 8:
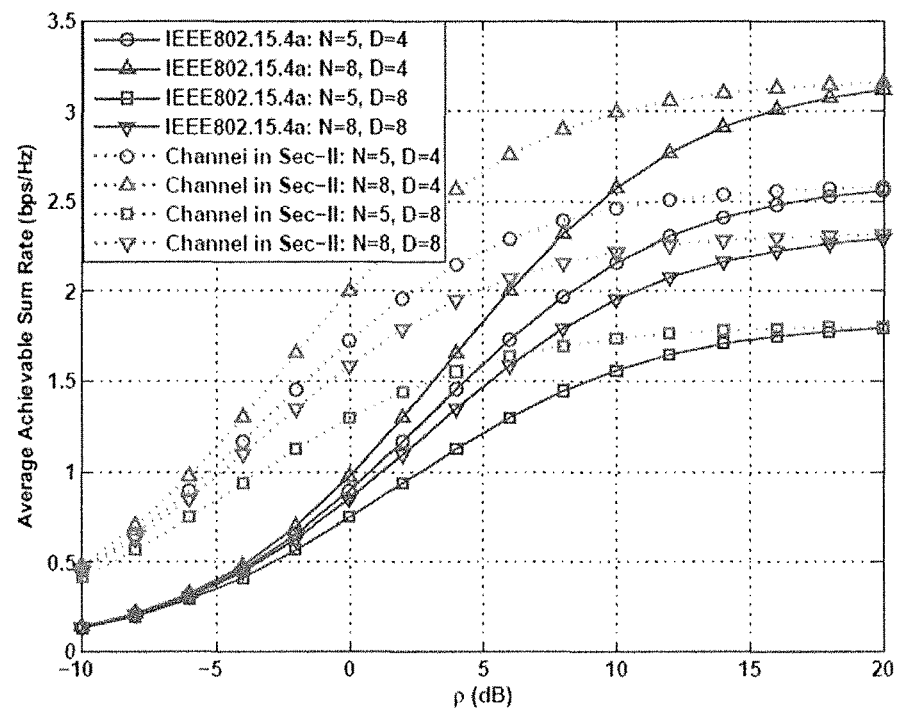
FIG. 8 illustrates a comparison of the achievable-sum-rate performances for the exemplary TRDMA systems as compared to an IEEE 802.15.4a outdoor non-line-of-sight (NLOS) channel in a certain bandwidth.
Figure 9:
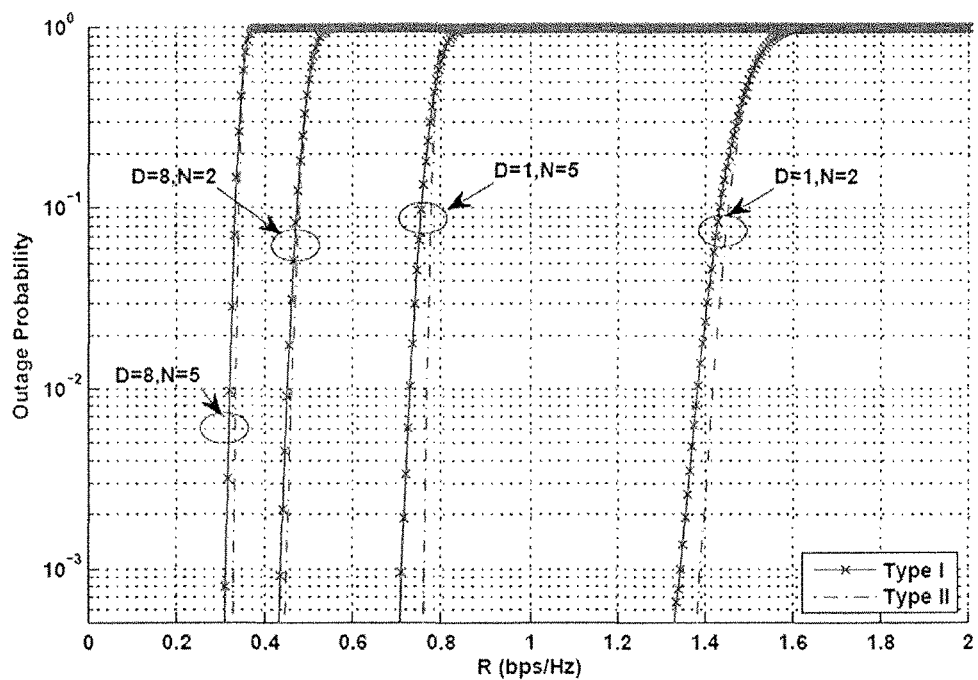
FIG. 9 illustrates two types of ε-outage probabilities as functions of the transmission rate R in the exemplary TRDMA systems.
Figure 10:
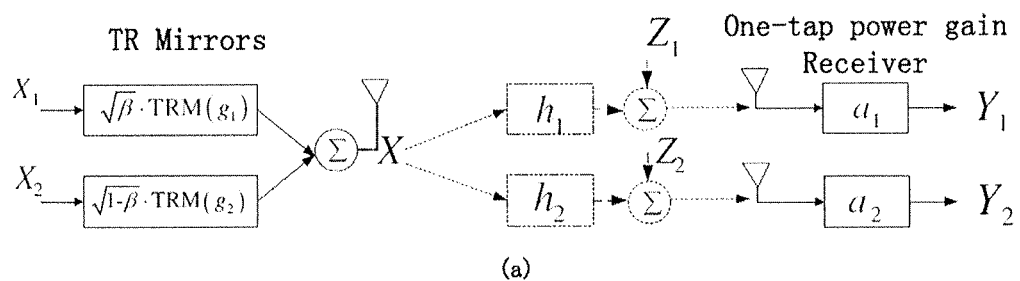
FIG. 10 (b) shows a two-user rake-receiver based downlink solution.
Figure 10:
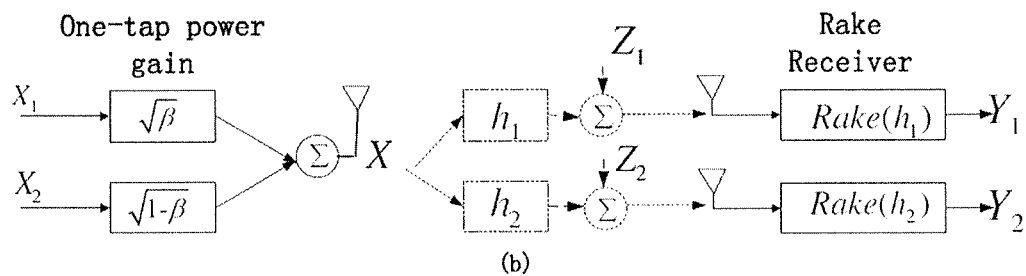
Figure 11:
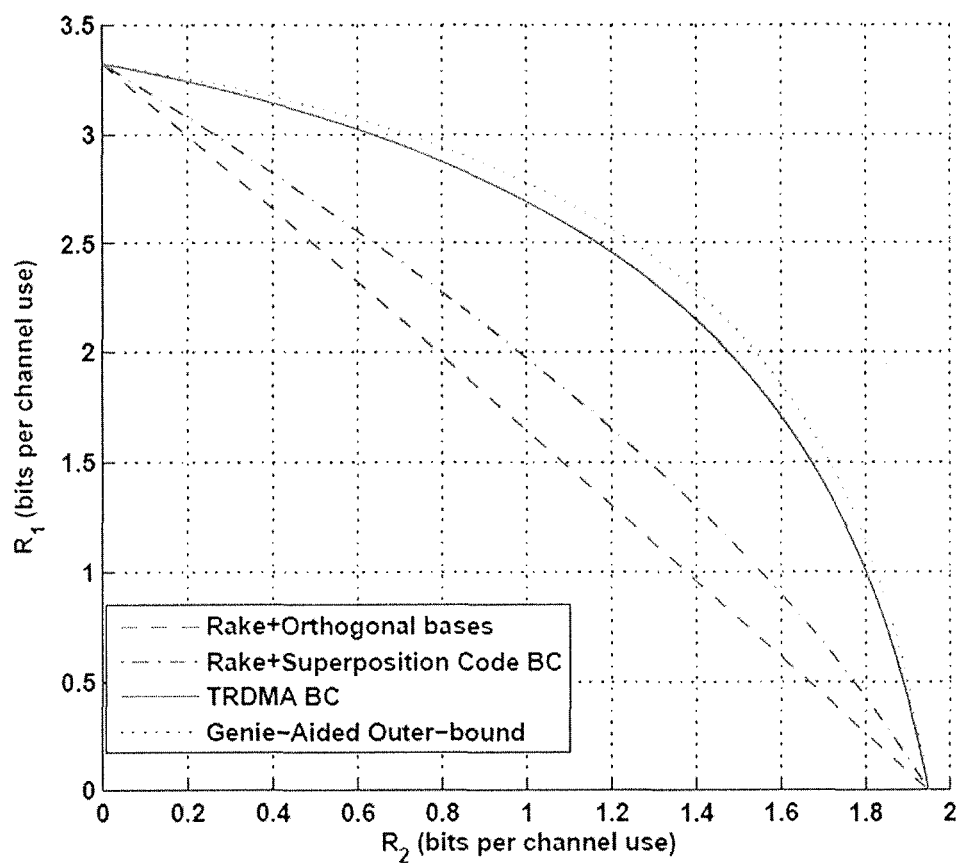
FIG. 11 illustrates a comparison of the performances of the systems shown in FIGS. 10(a) and 10(b)
Figure 12:
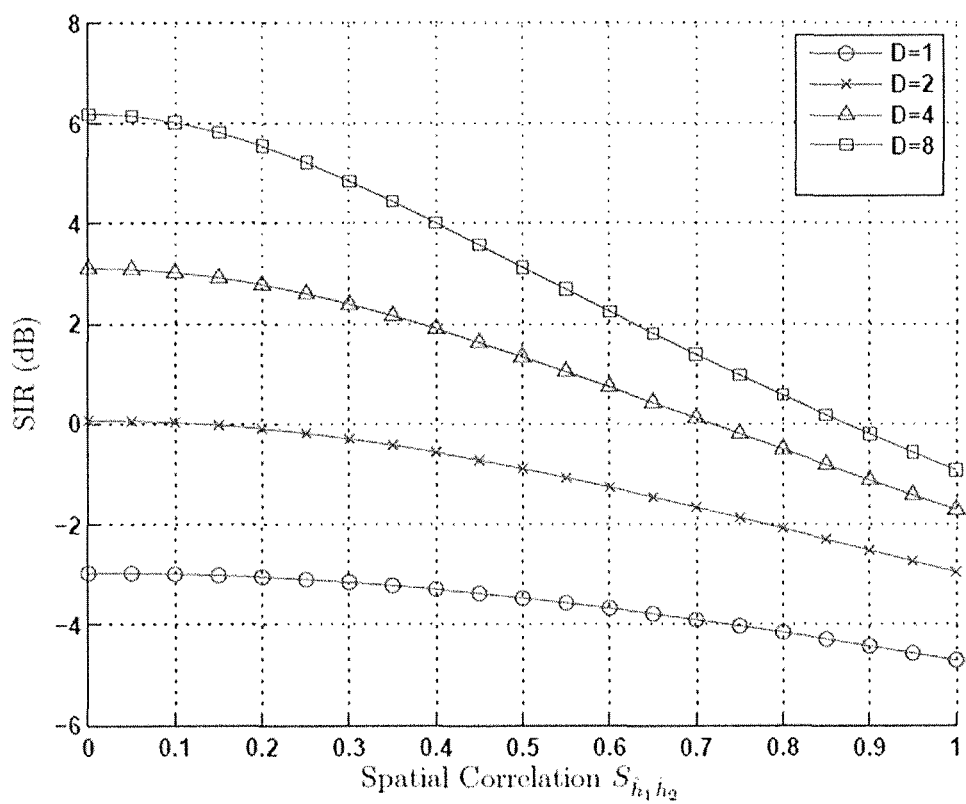
FIG. 12 illustrates the impact of spatial correlation between users on the SIR in the exemplary TRDMA downlink systems.

The detailed description is organized as follows. In Section II, we introduce the channel model and the exemplary TRDMA multi-user downlink systems with both a single transmit antenna (FIG. 1) and multiple antennas (FIG. 2). Then, we analyze the effective SINR in Section III (FIGS. 3-6). In Section IV, both achievable sum rate and ε-outage rate are evaluated (FIGS. 7-9). Also in Section IV, a two-user case achievable rate region is characterized and compared with the rake-receiver counterparts (FIGS. 10-11). In Section V, the impact of spatial correlation between users is investigated and discussed (FIG. 12). Finally, conclusions are drawn in Section VI.

II. System Model

In this section, we introduce the exemplary channel and system model and the exemplary TRDMA schemes. We begin with the assumptions and formulations of the channel model. Then, we describe the two phases of the basic TRDMA scheme with a single transmit antenna, as shown in FIG. 1. Finally, we extend the basic single-input-single-output (SISO) scheme to an enhanced multiple-input-single-output (MISO) TRDMA scheme with multiple transmit antennas at the base station (BS), as shown in FIG. 2.

A. Channel Model

A multi-user downlink network over multi-path Rayleigh fading channels is disclosed. We first look at a SISO case where the base station (BS) 10 and all users $30_1$-$30_N$ are equipped with a single antenna (FIG. 1). The channel impulse response (CIR) of the communication link between the BS 10 and the i-th user is modeled as $$h_i[k] = \sum_{l=0}^{L-1} h_{i,l} \delta[k-l], \quad (1)$$

where $h_i[K]$ is the k-th tap of the CIR with length L, and $\delta[\ ]$ is the Dirac delta function. For each link, we assume that $h_i[k]$'s are independent circular symmetric complex Gaussian (CSCG) random variables with zero mean and variance $$E[|h_i[k]|^2] = e^{-\frac{kT_S}{\sigma_T}}, 0 \le k \le L-1 \quad (2)$$

where $T_S$ is the sampling period of this system such that $1/T_S$ equals the system bandwidth B, and $\sigma_T$ is the root mean square (rms) delay spread of the channel. Due to the two-phase nature of TR structure, we assume that channels are reciprocal, ergodic and blockwise-constant with their tap values remaining fixed during at least one duty cycle. Each duty cycle includes the recording phase and the transmission phase, which occupy the proportions of (η−1) and η of the cycle period, with η∈(0,1) depending on how fast channels vary over time.

We first assume that the CIRs associated with different users are uncorrelated. While realistic CIRs might not be perfectly uncorrelated, this assumption greatly simplifies the analysis while capturing the essential idea of TRDMA. Moreover, real-life experimental results have shown that in a rich-scattering environment the correlation between CIRs associated with different locations decreases to a negligible level when two locations are even just several wave-lengths apart. A further discussion on the impact of the channel correlation between users to the system performance will be addressed in Section V.

B. Phase 1: Recording Phase

FIG. 1 shows a block diagram of a SISO TRDMA downlink system 100 according to an exemplary embodiment, in which there are N users $30_1$-$30_N$ (also referred to as receivers $30_1$-$30_N$) receiving statistically independent messages $\{X_1(k), X_2(k), \ldots, X_N(k)\}$ from the BS 10, respectively, via the wireless channels $20_1$-$20_N$. The BS 10 includes a conversion module 10-1 and the time reversal mirror (TRM) 10-2 comprising plural TRMs.

The TRM 10-2 shown in FIG. 1 is a device that can record and time-reverse (and conjugate if complex-valued) a received waveform, which will be used to modulate the time-reversed waveform with an input signal by convolving them together in the following transmission phase, as described in further detail below.

During the recoding phase, the N intended users $30_1$-$30_N$ first take turns to transmit an impulse signal to the BS 10 (ideally the impulse signal can be a Dirac δ-function, but in practice a modified raise-cosine signal can be a good candidate for limited bandwidth for this purpose). Meanwhile, the TRMs 10-2 at the BS 10 record the channel response of each link and store the time-reversed and conjugated version of each channel response for the transmission phase. For simplicity of analytical derivation, we assume in our analysis that the waveform recorded by TRM reflects the true CIR, ignoring the small corruption caused by thermal noise and quantization noise. Such a simplification is justified and based on the following known characteristics of time reversal:

The thermal noise (typically modeled as additive white Gaussian noise (AWGN)) can be effectively reduced to a desired level by averaging multiple recorded noisy samples of the same CIR's, provided that channels are slow-varying, as shown in the real-life experiments. This would increase the portion (1−η) of the recording phase in the entire duty cycle, leading to an increased channel probing overhead; but the structure of the analysis for the exemplary system(s) is not altered.

The effect of quantization has been studied and it has been shown that a nine-bit quantization can be treated as nearly perfect for most applications; and even with one-bit quantization, the TR system can work reasonably well, demonstrating the robustness of the TR-based transmission technique.

C. Phase 2: Transmission Phase

After the channel recording phase (Phase 1), the transmission phase is initiated. At the BS 10, each of $\{X_1, X_2, \ldots, X_N\}$ represents a sequence of information symbols that are independent complex random variables with zero mean and variance of θ. In other words, we assume that for each i from 1 to N, $X_i[k]$ and $X_i[l]$ are independent when k≠l. As mentioned earlier, any two sequences of $\{X_1, X_2, \ldots, X_N\}$ are also independent in this exemplary model. We introduce the rate back-off factor D as the ratio of the sampling rate to the baud rate, by performing up-sampling and down-sampling with a factor D at the rate conversion module 10-1 of the BS 10 and the rate conversion module 30-1 at the receivers $30_1$-$30_N$ as shown in FIG. 1. Such a notion of back-off factor facilitates simple rate conversion in the analysis of a TR system.

These sequences $\{X_1, X_2, \ldots, X_N\}$ are first up-sampled by a factor of D at the rate conversion module 10-1 of BS 10, and the i-th up-sampled sequence can be expressed as $$X_i^{[D]}[k] = \begin{cases} X_i[k/D], & \text{if } k \bmod D = 0, \\ 0, & \text{if } k \bmod D \neq 0. \end{cases} \quad (3)$$

Then the up-sampled sequences are fed into the bank of TRMs $\{g_1, g_2, \ldots, g_N\}$ 10-2, where the output of the i-th TRM $g_i$ is the convolution of the i-th up-sampled sequence $\{X_i^{[D]}[k]\}$ and the TR waveform $\{g_i[k]\}$ as shown in FIG. 1, with $$g_i[k] = h_i^*[L-1-k] / \sqrt{E\left[\sum_{l=0}^{L-1} |h_i[l]|^2\right]}, \quad (4)$$

where $g_i[k]$ is the normalized (by the average channel gain) complex conjugate of time-reversed $\{h_i[k]\}$. After that, all the outputs of the TRM bank 10-2 are added together at adder 10-3, and then the combined signal $\{S[k]\}$ is transmitted into wireless channels $20_1$-$20_N$ with $$S[k] = \sum_{i=1}^{N} (X_i^{[D]} * g_i)[k]. \quad (5)$$

In essence, by convolving the information symbol sequences with TR waveforms, TRMs 10-2 provide a mechanism of embedding the unique location-specific signature associated with each communication link into the transmitted signal for the intended user.

The signal received at user i (i.e., one of the users $30_1$-$30_N$) is represented as follows $$Y_i^{[D]}[k] = \sum_{j=1}^{N} (X_j^{[D]} * g_j * h_i)[k] + \tilde{n}_i[k], \quad (6)$$

which is the convolution of the transmitted signal $\{S[k]\}$ and the CIR $\{h_i[k]\}$, plus an additive white Gaussian noise sequence $\{\tilde{n}_i[k]\}$ with zero mean and variance $\sigma^2$.

In view of the temporal focusing effect, the signal energy is concentrated in a single time sample. The i-th receiver (user i) 30 simply performs a one-tap gain adjustment $a_i$ to the received signal using the adjustment module 30-2 to recover the signal and then down-samples it with the same factor D using the rate conversion module 30-1, ending up with $Y_i[k]$ given as follows (for notational simplicity, L−1 is assumed to be a multiple of D)

$$Y_i[k] = a_i \sum_{j=1}^{N} \sum_{l=0}^{(2L-2)/D} (h_i * g_j)[Dl] X_j[k-l] + a_i n_i[k], \quad (7)$$

where $$(h_i * g_j)[k] = \left(\sum_{l=0}^{L-1} h_i[l] h_j^*[L-1-k+l]\right) / \sqrt{E\left[\sum_{l=0}^{L-1} |h_j[l]|^2\right]} \quad (8)$$

with k=0, 1, ..., $2^L$−2, and $n_i[k]$=ni[Dk], which is AWGN with zero mean and variance $\sigma^2$.

D. TRDMA with Multiple Transmit Antennas

In this exemplary embodiment described with reference to FIG. 2, we generalize the basic TRDMA scheme into an enhanced version with multiple transmit antennas. To maintain low complexity at receivers, we consider a MISO case where the transmitting BS 10' is equipped with $M_T$ antennas together with multiple single-antenna users $30_1$-$30_N$.

Let $h_i^{(m)}[k]$ denote the k-th tap of the CIR for the communication link between user i and the m-th antenna of the BS 10', and we assume it is a circular symmetric complex Gaussian random variable with zero mean and a variance $$E\left[|h_i^{(m)}[k]|^2\right] = e^{-\frac{kT_S}{\sigma_T}}. \quad (9)$$

In alignment with the basic SISO case of FIG. 1, we also assume that paths associated with different antennas are uncorrelated, i.e. $h_i^{(m)}[k]$ and $h_j^{(w)}[l]$ are uncorrelated for ∀i, $j \in \{1, 2, \ldots, N\}$ and $\forall\, k, l \in \{0, 1, \ldots, L-1\}$ when $m \neq w$, where $m, w \in \{1, 2, \ldots, M_T\}$ are the indices of the m-th and w-th antennas at the BS.

For the MISO TRDMA scheme, each antenna at the BS 10' in FIG. 2 plays a role similar to the single-antenna BS 10 in the basic scheme described with reference to FIG. 1. The block diagram for the MISO TRDMA according to this exemplary embodiment is shown in FIG. 2. The TR waveform $\{g_i^{(m)}[k]\}$ is the normalized (by the average total energy of MISO channels) complex conjugate of time-reversed $\{h_i^{(m)}[k]\}$, i.e.

$$g_i^{(m)}[k] = h_i^{(m)*}[L-1-k] \Big/ \sqrt{E\left[M_T \sum_{l=0}^{L-1} |h_i^{(m)}[l]|^2\right]}. \quad (10)$$

As a result, the average total transmit power at the BS is $$P = \frac{N \times \theta}{D}, \quad (11)$$

which does not depend on the number of the transmit antennas $M_T$.

The resulting received signal at user i can be similarly represented as $$Y_i[k] = \sum_{j=1}^{N} \sum_{m=1}^{M_T} \sum_{l=0}^{2L-2} (h_i^{(m)} * g_j^{(m)})[Dl] X_j[k-l] + n[k], \quad (12)$$

where n[k] is additive white Gaussian noise with zero mean and variance $\sigma^2$.

Hereafter, we define a modified received signal-to-noise ratio (SNR) $\rho$ as $$\rho = \frac{P}{\sigma^2} E\left[\sum_{l=0}^{L-1} |h_i^{(m)}[l]|^2\right] = \frac{P}{\sigma^2} \frac{1 - e^{-\frac{LT_S}{\sigma_T}}}{1 - e^{-\frac{T_S}{\sigma_T}}}, \quad (13)$$

to rule out the potential multi-path gain in the system model in the following performance evaluations.

In the following sections, we evaluate the system performance of the exemplary systems described above with respect to FIGS. 1 and 2 in terms of the effective SINR, the achievable sum rate, and the achievable rates with ε-outage.

III. Effective SINR

In this section, we evaluate the effective SINR of the exemplary systems described above with respect to FIGS. 1 and 2. Since the basic SISO scheme (FIG. 1) is just a special case with $M_T = 1$, we analyze the general MISO case (FIG. 2) with $M_T$ as a parameter in this section.

Note that for $\{(h_i^{(m)} * g_j^{(m)})[k]\}$ in (12), when k=L−1 and j=i, it corresponds to the maximum power central peak of the autocorrelation function, i.e.

$$(h_i^{(m)} * g_i^{(m)})[L-1] = \sum_{l=0}^{L-1} |h_i^{(m)}[l]|^2 \Big/ \sqrt{E\left[M_T \sum_{l=0}^{L-1} |h_i^{(m)}[l]|^2\right]}. \quad (14)$$

Subject to the constraint of one-tap receivers, the i-th receiver is designed to estimate $$X_i\left[k - \frac{L-1}{D}\right]$$

solely based on the observation of $Y_i[k]$. Then, the remaining components of $Y_i$ can be further categorized into inter-symbol interference (ISI), inter-user interference (IUI) and noise, as shown below:

$$Y_i[k] = a_i \sum_{m=1}^{M_T} (h_i^{(m)} * g_i^{(m)})[L-1] X_i\left[k - \frac{L-1}{D}\right] + \quad \text{(Signal)} \quad (15)$$

$$a_i \sum_{\substack{l=0 \\ l \neq (L-1)/D}}^{(2L-2)/D} \sum_{m=1}^{M_T} (h_i^{(m)} * g_i^{(m)})[Dl] X_i[k-l] + \quad \text{(ISI)}$$

$$a_i \sum_{\substack{j=1 \\ j \neq i}}^{N} \sum_{l=0}^{(2L-2)/D} \sum_{m=1}^{M_T} (h_i^{(m)} * g_j^{(m)})[Dl] X_j[k-l] + \quad \text{(IUI)}$$

$$a_i n_i[k]. \quad \text{(Noise)}$$

Note that the one-tap gain $a_i$ does not affect the effective SINR, we consider it as $a_i = 1$ in the subsequent analysis, without loss of generality.

Given a specific realization of the random CIRs, from (15), one can calculate the signal power $P_{Sig}(i)$ as $$P_{Sig}(i) = E_X\left[\left|\sum_{m=1}^{M_T} (h_i^{(m)} * g_i^{(m)})[L-1] X_i\left[k - \frac{L-1}{D}\right]\right|^2\right] \quad (16)$$

$$= \theta \left|\sum_{m=1}^{M_T} (h_i^{(m)} * g_i^{(m)})[L-1]\right|^2,$$

where $E_X[\cdot]$ represents the expectation over X. Accordingly, the powers associated with ISI and IUI can be derived as $$P_{ISI}(i) = \theta \sum_{\substack{l=0 \\ l \neq \frac{L-1}{D}}}^{\frac{2L-2}{D}} \left|\sum_{m=1}^{M_T} (h_i^{(m)} * g_i^{(m)})[Dl]\right|^2, \quad (17)$$

$$P_{IUI}(i) = \theta \sum_{\substack{j=1 \\ j \neq i}}^{N} \sum_{l=0}^{\frac{2L-2}{D}} \left|\sum_{m=1}^{M_T} (h_i^{(m)} * g_j^{(m)})[Dl]\right|^2. \quad (18)$$

When there exists interference, the SINR is almost always a crucial performance metric used to measure the extent to which a signal is corrupted. It is especially the case for a media-access scheme, where interference management is one of the main design objectives. In this part, we investigate the effective SINR at each user in this multi-user network.

We define the average effective SINR at user i $SINR_{avg}(i)$ as the ratio of the average signal power to the average interference-and-noise power, i.e., $$SINR_{avg}(i) = \frac{E[P_{Sig}(i)]}{E[P_{ISI}(i)] + E[P_{IUI}(i)] + \sigma^2}, \quad (19)$$

where each term has been specified in (16), (17) and (18). Note that such defined effective SINR in (19) bears difference with the quantity $$E\left[\frac{P_{Sig}(i)}{P_{ISI}(i) + P_{IUI}(i) + \sigma^2}\right]$$

in general. The former can be treated as an approximation of the latter quantity. Such an approximation is useful when the calculation of the average SINR using multiple integration is too complex, as is the case here. The performance of this approximation will be demonstrated in the numerical results shown in FIGS. 3, 4 and 5.

Theorem 1.

For the independent multi-path Rayleigh fading channels given in Section II, the expected value of each term for the average effective SINR (19) at user i can be obtained as follows:

$$E[P_{Sig}(i)] = \theta \frac{(M_T+1)\left(1 - e^{-\frac{(L+1)T_S}{\sigma_T}}\right) + (M_T-1)\left(e^{-\frac{T_S}{\sigma_T}} - e^{-\frac{LT_S}{\sigma_T}}\right)}{e^{-2T_S}}; \quad (20)$$

$$E[P_{ISI}(i)] = 2\theta \frac{e^{-\frac{T_S}{\sigma_T}}\left(1 - e^{-\frac{(L+2+D)T_S}{\sigma_T}}\right)}{\left(1 - e^{-\frac{DT_S}{\sigma_T}}\right)\left(1 + e^{-\frac{T_S}{\sigma_T}}\right)}; \quad (21)$$

$$E[P_{IUI}(i)] = \theta(N-1)\frac{1 + e^{-\frac{DT_S}{\sigma_T}} + e^{-\frac{2LT_S}{\sigma_T}} - 2e^{-\frac{(L+1)T_S}{\sigma_T}} - 2e^{-\frac{(D+L-1)T_S}{\sigma_T}} + e^{-\frac{(D+2L)T_S}{\sigma_T}}}{\left(1 - e^{-\frac{DT_S}{\sigma_T}}\right)\left(1 + e^{-\frac{T_S}{\sigma_T}}\right)\left(1 - e^{-\frac{LT_S}{\sigma_T}}\right)}. \quad (22)$$

Proof:

Based on the channel model presented in Section II, the second and fourth moments of $h_i^{(m)}[k]$ are given by $$E\left[|h_i^{(m)}[k]|^2\right] = e^{-\frac{kT_S}{\sigma_T}}, \quad (23)$$

$$E\left[|h_i^{(m)}[k]|^4\right] = 2\left(E\left[|h_i^{(m)}[k]|^2\right]\right)^2 = 2e^{-\frac{2kT_S}{\sigma_T}} \quad (24)$$

Based on (23) and (24), after some basic mathematical derivations, we obtain the following expected values: for $\forall i \in \{1, 2, \ldots, N\}$, $$E\left[\left|\sum_{m=1}^{M_T}(h_i^{(m)} * g_i^{(m)})[L-1]\right|^2\right] = \frac{(M_T+1)\left(1 - e^{-\frac{(L+1)T_S}{\sigma_T}}\right) + (M_T-1)\left(e^{-\frac{T_S}{\sigma_T}} - e^{-\frac{LT_S}{\sigma_T}}\right)}{1 - e^{-\frac{2T_S}{\sigma_T}}} \quad (25)$$

$$E = \sum_{\substack{l=0 \\ i \neq \frac{L-1}{D}}}^{\frac{2L-2}{D}} \left|\sum_{m=1}^{M_T}(h_i^{(m)} * g_i^{(m)})[Dl]\right|^2 = 2\frac{e^{-\frac{T_S}{\sigma_T}}\left(1 - e^{-\frac{(L-2+D)T_S}{\sigma_T}}\right)}{\left(1 - e^{-\frac{DT_S}{\sigma_T}}\right)\left(1 + e^{-\frac{T_S}{\sigma_T}}\right)}, \quad (26)$$

and $$E\left[\sum_{\substack{j=1 \\ j \neq i}}^{N}\sum_{l=0}^{\frac{2L-2}{D}}\left|\sum_{m=1}^{M_T}(h_j^{(m)} * g_i^{(m)})[Dl]\right|^2\right] = \quad (27)$$

$$(N-1)\frac{1 + e^{-\frac{DT_S}{\sigma_T}} + e^{-\frac{2LT_S}{\sigma_T}} - 2e^{-\frac{(L+1)T_S}{\sigma_T}} - 2e^{-\frac{(D+L-1)T_S}{\sigma_T}} + e^{-\frac{(D+2L)T_S}{\sigma_T}}}{\left(1 - e^{-\frac{DT_S}{\sigma_T}}\right)\left(1 + e^{-\frac{T_S}{\sigma_T}}\right)\left(1 - e^{-\frac{LT_S}{\sigma_T}}\right)}.$$

Therefore, according to (16-18), (20-22) are obtained as shown in Theorem 1.

From Theorem 1, it can be seen that the average interference powers (i.e. ISI and IUI) in (26) and (27) do not depend on $M_T$, while the signal power level in (25) increases linearly with the number of antennas, which is due to an enhanced focusing capability with multiple transmit antennas leveraging the multi-paths in the environment. The enhanced focusing effects monotonically improve the effective SINR. Another interesting observation is that a larger back-off factor D yields higher reception quality of each symbol, which is effective in the high SINR regime where interference power dominates the noise power. The asymptotic behavior of the SINR in the high SNR regime with varying D is given by the following theorem.

Theorem 2.

In the high SNR regime, when D is small such that D≪L and D≪$\sigma_T/T_S$, doubling D leads to approximately a 3 dB gain in the average effective SINR.

Proof:

First note that the signal power does not depend on D and that the noise is negligible in the high SINR regime. Thus, we can focus on the interference powers.

Inter-symbol Interference (ISI):

$$\frac{E[P_{ISI}(i, D=d)]}{E[P_{ISI}(i, D=2d)]} = \frac{\left(1 - e^{-\frac{3dT_S}{\sigma_T}}\right)\left(1 - e^{-\frac{(L-2+d)T_S}{\sigma_T}}\right)}{\left(1 - e^{-\frac{dT_S}{\sigma_T}}\right)\left(1 - e^{-\frac{(L-2+2d)T_S}{\sigma_T}}\right)} \quad (28)$$

$$= \left(1 + e^{-\frac{dT_S}{\sigma_T}}\right)\frac{\left(1 - e^{-\frac{(L-2+d)T_S}{\sigma_T}}\right)}{\left(1 - e^{-\frac{(L-2+2d)T_S}{\sigma_T}}\right)}$$

Since D≪L, then $$\frac{\left(1 - e^{-\frac{(L-2+d)T_S}{\sigma_T}}\right)}{\left(1 - e^{-\frac{(L-2+2d)T_S}{\sigma_T}}\right)} \approx 1;$$

and since $$D \ll \frac{\sigma}{T_S}, \text{ then } e^{-\frac{dT_S}{\sigma_T}} \approx 1.$$

Therefore, $$\frac{E[P_{ISI}(i, D = d)]}{E[P_{ISI}(i, D = 2d)]} \approx 2.$$

Inter-user Interference (IUI):

$$\frac{E[P_{IUI}(i, D = d)]}{E[P_{IUI}(i, D = 2d)]} = \quad (29)$$

$$\left(1 + e^{-\frac{dT_S}{\sigma_T}}\right) \frac{2e^{-\frac{(L+1)T_S}{\sigma_T}} - 2e^{-\frac{(d+L-1)T_S}{\sigma_T}} + e^{-\frac{(d+3L)T_S}{\sigma_T}}}{1 + e^{-\frac{2dT_S}{\sigma_T}} + e^{-\frac{2LT_S}{\sigma_T}} - }$$

$$2e^{-\frac{(L+1)T_S}{\sigma_T}} - 2e^{-\frac{(2d+L-1)T_S}{\sigma_T}} + e^{-\frac{(2d+2L)T_S}{\sigma_T}}$$

For similar reasons, $$\frac{E[P_{IUI}(i, D = d)]}{E[P_{IUI}(i, D = 2d)]} \approx 2.$$

Next, some numerical evaluation of the average effective SINR is presented. Broadband systems with frequency bandwidth that typically ranges from hundreds MHz to several GHz are considered, which bandwidth is much wider that those narrow-band systems specified in 3GPP/3GPP2. In the rich scattering environment, the underlying paths are so many that the number of perceived multiple paths increases quickly with the system bandwidth. For a system with bandwidth B, the minimum resolvable time-difference between two paths is $T_S=1/B$.

Keeping this in mind, we first choose L=257 and $\sigma_T=128T_S$ from a typical range, and evaluate the average effective SINR versus ρ under various system configurations in terms of N (the number of users), $M_T$ (the number of antennas), and D (the rate back-off factor).

Figure 3:
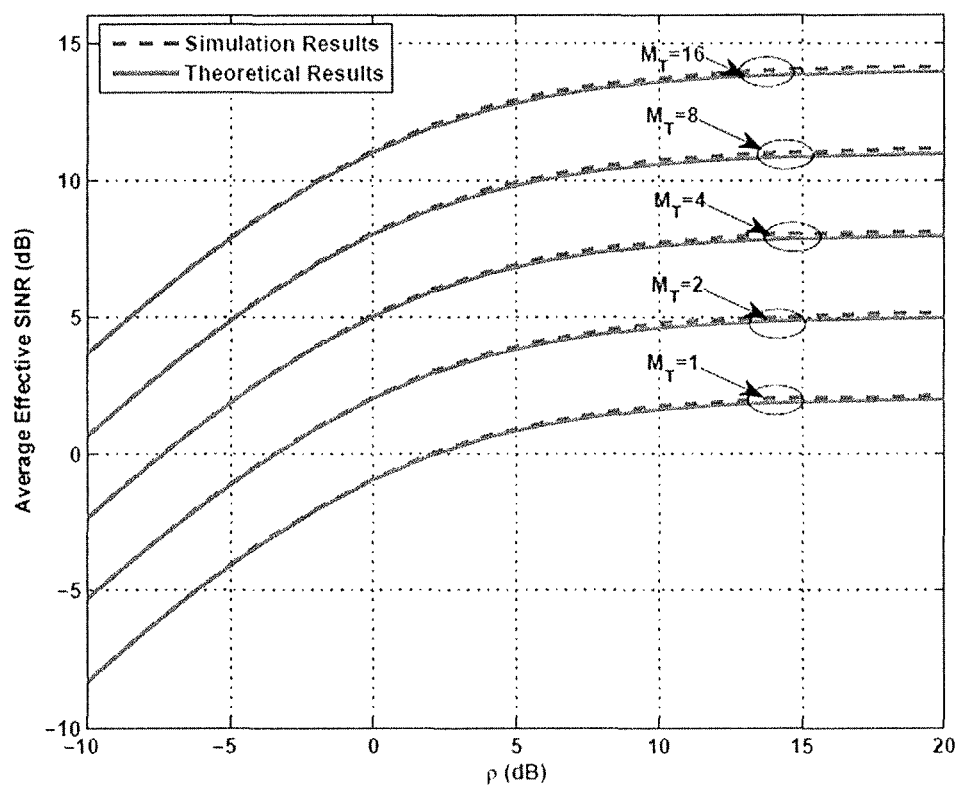
FIG. 3 illustrates the impact of the number of antennas $M_T$ on the effective SINR in the exemplary TRDMA downlink systems.
Figure 4:
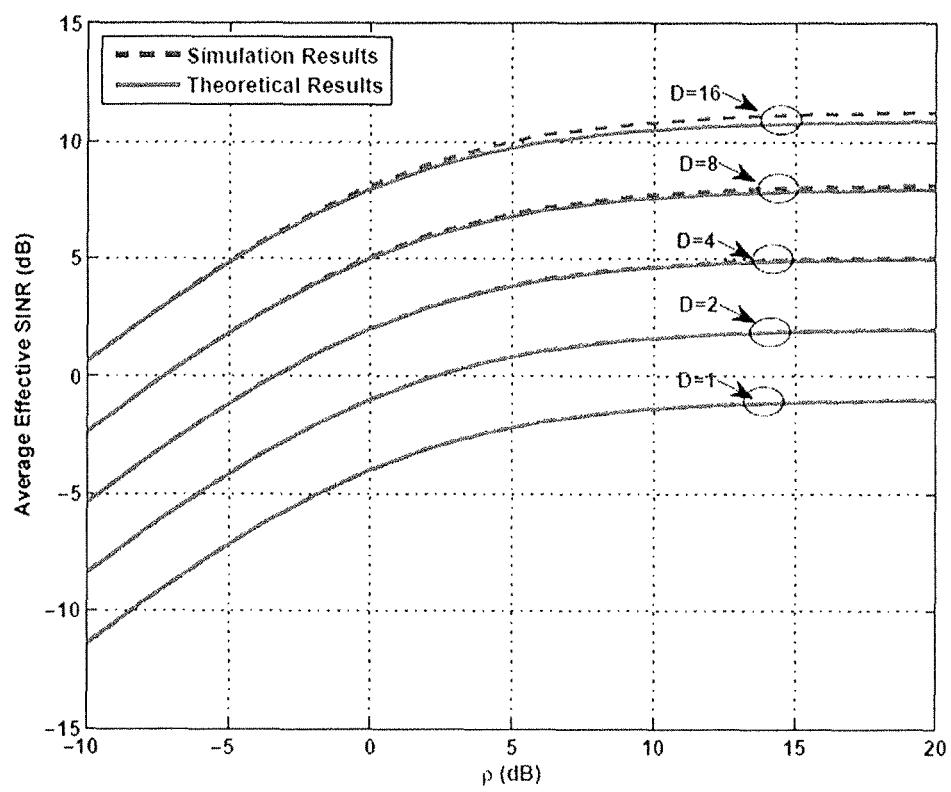
FIG. 4 illustrates the impact of the rate back-off on the effective SINR in the exemplary TRDMA downlink systems.
Figure 5:
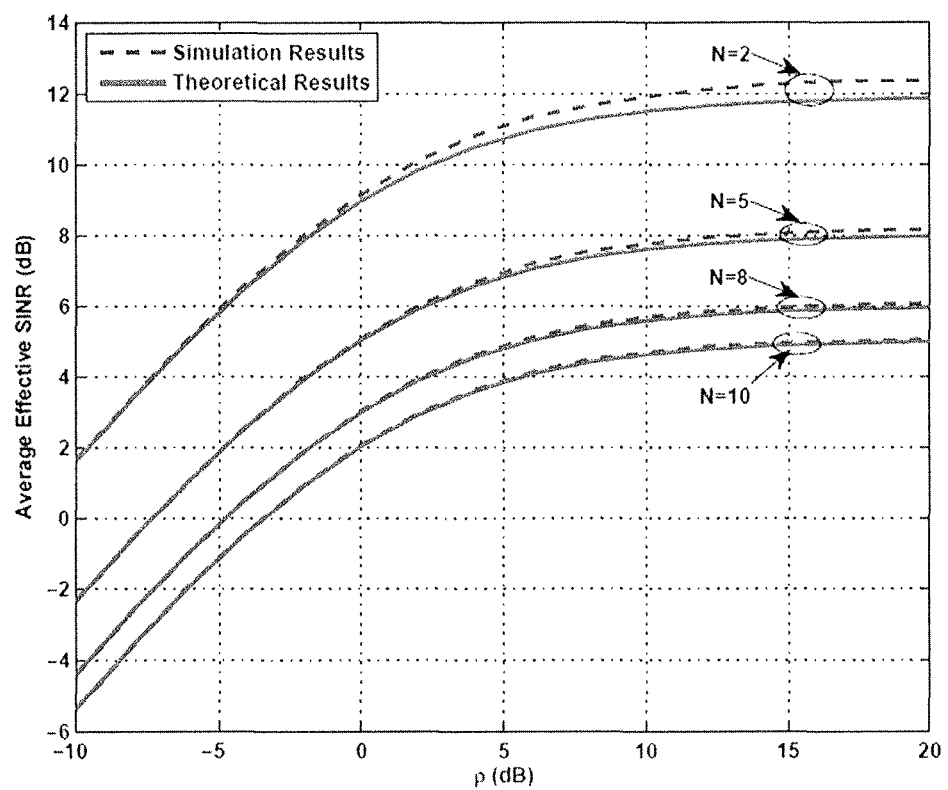
FIG. 5 illustrates the impact of the number of users on the effective SINR in the exemplary TRDMA downlink systems.

In FIG. 3, FIG. 4, and FIG. 5, with L=257 and $\sigma_T=128T_S$, the solid curves are obtained according to the analytical results given by Theorem 1, and the dashed curves are collected from simulation which numerically computes $$E\left[\frac{P_{Sig}(i)}{P_{ISI}(i) + P_{IUI}(i) + \sigma^2}\right].$$

One can see that the results shown in Theorem 1 approximate well the empirical means obtained by simulation, which demonstrates the effectiveness of the definition of effective SINR in the exemplary embodiments described with respect to FIGS. 1 and 2.

FIG. 3 is plotted with D=8 and N=5, demonstrating the impact of the number of antennas $M_T$ to the effective SINR.

From FIG. 3, one can see that approximately a 3 dB gain is attained as $M_T$ is doubled within a reasonable range.

The impact of the rate back-off to the effective SINR is shown with N=5, $M_T$=4 in FIG. 4. Both analytical formulas and simulation results show that a lager D can reduce ISI and IUI while maintaining the signal power. In the high SNR regime where interference powers dominates the noise power, approximately a 3 dB gain in effective SINR can be seen when D is doubled in FIG. 4, as predicted in Theorem 2.

In FIG. 5, we investigate the impact of the number of users with D=8, $M_T$=4. Due to the existence of IUI, increasing the number of co-existing users will result in higher interference between users. That implies a tradeoff between the network capacity (in terms of number of serviced users) and signal reception quality at each user, as indicated in FIG. 5.

Furthermore, to demonstrate the usefulness and practical importance of TRDMA, we apply the exemplary scheme(s) disclosed with respect to FIGS. 1 and 2 to more practical channel models, the IEEE 802.15.4a outdoor non-line-of-sight (NLOS) channels, operating over bandwidth of B=500 MHz ($T_S$=2 ns and the typical channel length L~80 to 150 taps) and B=1 GHz ($T_S$=1 ns and the typical channel length L~200 to 300 taps), respectively.

Figure 6:
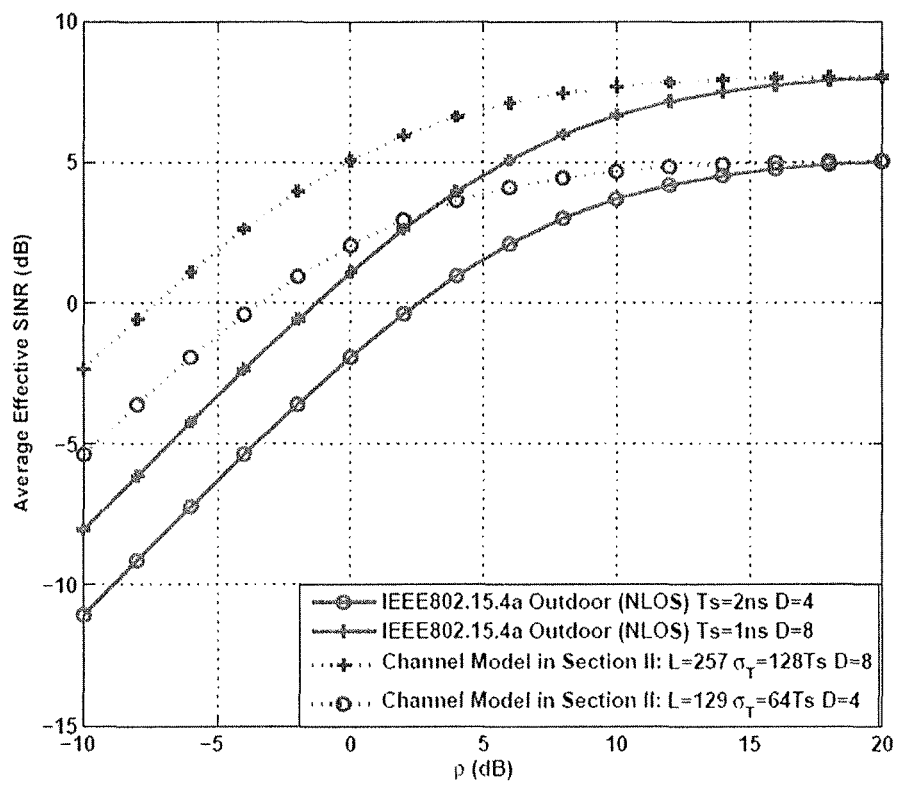
FIG. 6 illustrates the performances of the exemplary TRDMA systems as compared to two IEEE 802.15.4a outdoor non-line-of-sight (NLOS) channels operating over two different bandwidths.

FIG. 6 shows the performances of the exemplary TRDMA scheme over the two aforementioned more practical channel models with $M_T$=4. Such two practical channel models have comparable system bandwidth and channel lengths with the systems which TRDMA is designed for. From FIG. 6, one can see that the performances for the practical channel models well preserve the system performances obtained for the theoretical model(s) of the exemplary embodiments, especially in the high SNR regime. Note that in FIG. 6, we set D=4 and 8 for the channels with $T_S$=2 ns and $T_S$=1 ns, respectively, to ensure that their baud rates (i.e. B/D) are the same for a fair comparison of the two.

As seen from this comparison, a channel's multi-path richness (or higher resolution of perceiving multiple paths) due to the broader system bandwidth, gives rise to better user-separation in the exemplary TRDMA scheme, which in essence increases the degree of freedom of the location-specific signatures.

IV. Achievable Rates

In this section, we evaluate the exemplary TRDMA schemes in terms of achievable rates. We first look at its achievable sum rate (FIGS. 7-8). Then, two types of achievable rates with ϵ-outage are defined and analyzed (FIG. 9). Finally, we derive the two-user achievable rate region of the TR structure and compare it with its rake-receiver counterparts (FIGS. 10a-10b and 11).

A. Achievable Sum Rate

The achievable sum rate can be used as an important metric of the efficiency of a wireless downlink scheme, which measures the total amount of information that can be effectively delivered given the total transmit power constraint P.

When the total transmit power is P, the variance of each symbol is limited to θ=PD/N, according to the simple conversion shown in (11). For any instantaneous realization of the random channels that we modeled in Section II, one could obtain its corresponding instantaneous effective SINR of user i with symbol variance θ using the following equation $$SINR(i, \theta) \triangleq \frac{P_{Sig}(i)}{P_{ISI}(i) + P_{IUI}(i) + \sigma^2}, \quad (30)$$

where each term is specified in (16), (17) and (18).

Then, under the total power constraint P, the instantaneous achievable rate of user i can be calculated as $$R(i) = \frac{\eta}{T_S \times B \times D} \log_2(1 + SINR(i, PD/N)), \quad (31)$$
$$= \frac{\eta}{D} \log_2(1 + SINR(i, PD/N)) \text{ (bps/Hz)}$$

where η serves as a discount factor that describe the proportion of the transmission phase in the entire duty cycle. We normalize the sum rate with bandwidth $B=1/T_S$, presenting the information rate achieved per unit bandwidth (often referred to as spectral efficiency). It is also worth noting that in (31), the quantity is divided by D, because of the consequence of rate back-off.

Accordingly, the instantaneous achievable sum rate can be obtained as $$R = \sum_{i=1}^{N} R(i) = \frac{\eta}{D} \sum_{i=1}^{N} \log_2(1 + SINR(i, PD/N)) \text{ (bps/Hz)}. \quad (32)$$

Averaging (32) over all realizations of the random ergodic channels, the expected value of the instantaneous achievable sum rate is a good reference of the long-term performance and can be calculated by $$R_{avg} = E\left[\frac{\eta}{D} \sum_{i=1}^{N} \log_2(1 + SINR(i, PD/N))\right]. \quad (33)$$

In the following part of this section, without loss of generality, we use η=1, ignoring the overhead caused by the recording phase in each duty cycle, which is valid when the fading channels are not varying very fast.

The numerical evaluation of the average achievable sum rate is shown with the CIR length L=257 and delay spread $\sigma_T=128T_S$ in the system model. We plot this average achievable sum rate (setting η=1) in FIG. 7 with different system configurations. To show how well the scheme performs in more realistic environments, we also include a comparison of the achievable-sum-rate performances for the channel model (with L=257, $\sigma_T=128T_S$, and $M_T=4$) introduced in Section II and the IEEE802.15.4a Outdoor NLOS channel model (with B=1 GHz, $T_S=1$ ns, $M_T=4$) in FIG. 8.

From FIG. 7, it can be seen that the sum rate increases monotonically with $M_T$, as a result of improved SINRs achieved by enhanced spatial focusing.

From FIG. 8, it can be seen that the IEEE802.15.4a channel model with comparable channel length (L~200 to 300 taps) well preserves the achievable sum rates of the theoretical channel model introduced in Section II, especially in the high SNR regime. This demonstrates the effectiveness of TRDMA schemes of the exemplary embodiments described with reference to FIGS. 1 and 2 when applied to more practical channels.

From both FIG. 7 and FIG. 8, one can see that a larger N gives rise to a larger achievable sum rate, and a larger D discounts the achievable sum rate. The mechanisms of how D and N affect the sum rate are summarized as follows:

A larger N increases the concurrent data streams (or multiplexing order), while degrades the individual achievable rate of each user due to stronger interference among users. The SINR degradation is inside the logarithm function in (32), but the multiplexing order multiplies logarithm function, yielding a higher sum rate when N is larger.

On the other hand, a larger D improves the reception quality of each symbol as a result of reduced ISI, but it lowers the symbol rate of the transmitter. For similar reasons, the improvement of SINR inside the logarithm function cannot compensate the loss of lowering symbol rate.

Thus, a choice of the pair (D,N) can reveal a fundamental engineering tradeoff between the signal quality at each user and the sum rate of this network.

B. Achievable Rate with ε-Outage

In this part, we look at the achievable rate with ε-outage of the TRDMA-based multi-user network of the exemplary embodiments. The concept of ε-outage rate allows bits sent over random channels to be decoded with some probability of errors no larger than ε, namely the outage probability. Such a concept well applies to slow-varying channels, where the instantaneous achievable rate remains constant over a large number of transmissions, as is typically the case when the TR-structure is applied.

We first define two types of outage events in the TRDMA-based downlink network, and then characterize the outage probability of each type.

Definition 1. (Outage of type I (individual rate outage)) An outage of type I occurs at user i if the achievable rate of user i, as a random variable, is less than a given transmission rate R, i.e. the outage event of type I can be formulated as $$\left\{\frac{1}{D}\log_2(1 + SINR(i, \theta)) < R\right\},$$

and the corresponding outage probability of user i for rate R is $$P_{out\_I}(i) = Pr\left\{\frac{1}{D}\log_2(1 + SINR(i, \theta)) < R\right\}, \quad (34)$$

where SINR(i, θ) is given by (30) with the variance of each information symbol θ=PD/N.

Definition 2. (Outage of type II (average rate outage)) An outage of type II occurs if the rate achieved per user (averaged over all the users) in the network, as a random variable, is less than a given transmission rate R, i.e. the outage event of type II can be formulated as $$\left\{\frac{1}{N}\sum_{i=1}^{N}\frac{1}{D}\log_2(1 + SINR(i, \theta)) < R\right\},$$

and the corresponding outage probability for rate R is $$P_{out\_II} = Pr\left\{\frac{1}{D \cdot N}\sum_{i=1}^{N}\log_2(1 + SINR(i, \theta)) < R\right\}, \quad (35)$$

where SINR(i, θ) is given by (30) with the variance of each information symbol θ=PD/N.

We present the two types of outage probabilities as functions of the transmission rate R in FIG. 9. Without loss of generality (due to symmetry), we select user 1's type-I outage probability $P_{out,I}$ as a representative of others.

In FIG. 9, simulation is made with L=257 and $\sigma_T$=128$T_S$ under the normalized SNR level ρ=10 dB.

As can be seen in FIG. 9, the slopes of the curves are all very steep before the outage probabilities approach to 1. This indicates that the TR transmission technology disclosed with respect to the exemplary embodiments of FIGS. 1 and 2 could effectively combat the multi-path fading and makes the system behave in a more deterministic manner due to the strong law of large numbers. Such a property is highly desirable in a broad range of wireless communications, where link stability and reliability are prior concerns. Also, similar discounting effect on the achievable rate of rate back-off D is observed, and a larger N (i.e., a larger number of users) would also reduce the individual achievable rate with the same outage probability due to its resulting larger IUI.

C. Achievable Rate Region Improvement Over Rake Receivers

In this part, we present the exemplary TRDMA scheme's improvement of achievable rate region over its counterpart, the rake receivers. Note that in the single-user case, by shifting the equalization from the receiver to the transmitter, time reversal bears some mathematical similarity to the rake receivers whose number of fingers is equal or close to the length of channel impulse response. However, for some broadband communications with typically tens to hundreds of paths, the complexity of rake receiver with such a large number of fingers is not practical. We demonstrate the advantage of the exemplary embodiments of the TR structure over rake receivers in a multi-user scenario where spatial focusing effect of the exemplary TR structure plays an important role, with the derivation of the two-user achievable rate region (the case of more users can be extended by defining a region in higher dimensional space). Specifically, we look at the exemplary TRDMA scheme and rake-receiver-based schemes in terms of the amount of information delivered (mutual information between input and output) within one single transmission, measured by bits per use of the multi-path channel.

Consider a two-user downlink scenario, where the transmitter has two independent information symbols $X_1$ and $X_2$ for two different receivers, respectively. The links between the transmitter and each receiver are modeled as a discrete multi-path channel with impulse responses $h_1$ and $h_2$ as described in the non-limiting embodiments under Section II. FIG. 10 (a) shows an exemplary two-user single-antenna TRDMA scheme as described, e.g., with reference to FIG. 1; and FIG. 10 (b) shows a two-user rake-receiver based downlink solution. As we will show later, the exemplary TRDMA scheme outperforms the rake-receiver based schemes even when we assume that the number of fingers can be equal to the length of channel impulse response and that the delay, amplitude and phase of each path can be perfectly tracked by the rake receiver.

1) Rake Receivers:

For the ideal rake receivers in FIG. 10 (b), the equalized signals can be written as $$Y_1 = \|h_1\|_2 X + Z_1; \quad Y_2 = \|h_2\|_2 X + Z_2, \quad (36)$$

where $$\|h_i\|_2 = \sqrt{\sum_{l=0}^{L-1} |h_i(l)|^2}$$

is the Euclidean norm of the channel impulse response $h_i$, and $Z_i$ is additive white Gaussian noise with zero-mean and variance $\sigma_i^2$. X is the transmitted signal, which is the combination of the two information symbols $X_1$ and $X_2$.

One of the more intuitive way of combining $X_1$ and $X_2$ is to use orthogonal bases that allocate each user a fraction of the total available degrees of freedom. In the two-user case, suppose that $X(t)=\sqrt{\beta}X_1 c_1(t)+\sqrt{1-\beta}X_2 c_2(t)$ where $c_1(t)$ and $c_2(t)$ are two orthonormal basis functions that assign a fraction α∈(0,1) of the total available degrees of freedom to user 1 and (1−α) to user 2. We consider the two-user achievable rate region with a total transmit power constraint. Specifically, let us assume that $X_1$ and $X_2$ are independent and identically distributed (i.i.d.) random variables with variance Φ, with the power allocation factor β such that the variance of X var(X)=$(\sqrt{\beta})^2\theta+(\sqrt{1-\beta})^2\theta=\theta$.

Then, for the ideal rake receivers using orthogonal bases, the maximum achievable rate pair $(R_1, R_2)$ in bits per channel use is given by $$R_1 \le \alpha \log_2\left(1 + \frac{\beta \|h_1\|_2^2 P}{\alpha \sigma_1^2}\right); \quad (37)$$

$$R_2 \le (1-\alpha) \log_2\left(1 + \frac{(1-\beta)\|h_2\|_2^2 P}{(1-\alpha)\sigma_2^2}\right)$$

with all possible values $\alpha \in (0,1)$ and $\beta \in [0,1]$ defining the achievable rate region.

For the input-output correspondence shown in (36), the optimal frontier of the concurrently achievable rate pair is characterized by using superposition coding. Without loss of generality, we assume that $$\frac{\sigma_1^2}{\|h_1\|_2^2} \le \frac{\sigma_2^2}{\|h_2\|_2^2},$$

i.e. User 1's channel is advantageous to User 2's. Then the achievable rate region of the superposition coding is given by $$R_2 \le \log_2\left(1 + \frac{(1-\beta)\|h_2\|_2^2 P}{\beta\|h_2\|_2^2 P + \sigma_2^2}\right) \quad (38)$$

$$R_1 \le \log_2\left(1 + \frac{\beta\|h_1\|_2^2 P}{\alpha \sigma_1^2}\right)$$

where β∈[0,1] is the power allocation factor that defines the achievable rate region.

TRDMA Scheme and Genie-Aided Outer-Bound:

For the TRDMA scheme of the exemplary embodiment with a single-tap receiver, when just one single transmission is considered, the input-and-output correspondence is reduced to $$Y_1 = \sqrt{\beta}\|h_1\|_2 X_1 + \sqrt{1-\beta}(h_1 * g_2)(L-1)X_2 + Z_1; \quad Y_2 = \sqrt{1-\beta}\|h_2\|_2 X_2 + \sqrt{\beta}(h_2 * g_1)(L-1)X_1 + Z_2, \quad (39)$$

where $g_i(l)=h_i^*(L-1-l)/\|h_i\|_2$ implemented by TRMs, and $(h_j * g_i)$ denotes the convolution of $h_j$ and $g_i$. Then, the resulting mutual information is obtained as follows $$R_1 \leq \log_2\left(1 + \frac{\|h_1\|_2^2 \beta P}{|(h_1 * g_2)(L-1)|^2(1-\beta)P + \sigma_1^2}\right); \quad (40)$$

$$R_2 \leq \log_2\left(1 + \frac{\|h_2\|_2^2(1-\beta)P}{|(h_2 * g_1)(L-1)|^2 \beta P + \sigma_2^2}\right)$$

where $\beta \in [0,1]$ is the power allocation factor that defines the achievable rate region.

Lastly, we derive a genie-aided outer-bound for the two-user capacity region, in which case all the interference is assumed to be known and thus can be completely removed. Such a genie-aided outer-bound can be obtained with $\beta \in [0, 1]$ as follows $$R_1 \leq \log_2\left(1 + \frac{\|h_1\|_2^2 \beta P}{\sigma_1^2}\right); \quad (41)$$

$$R_2 \leq \log_2\left(1 + \frac{\|h_2\|_2^2(1-\beta)P}{\sigma_2^2}\right)$$

2) Numerical Comparison:

We present a numerical comparison of the capacity regions obtained in (37) (38) (40) and (41). In particular, we set $$\frac{\Phi E[\|h_1\|_2^2]}{\sigma_1^2} = 10 \text{ dB}$$

for User 1 and $$\frac{\Phi E[\|h_2\|_2^2]}{\sigma_2^2} = 5 \text{ dB}$$

for User 2.

In FIG. 11, results are obtained by averaging over 1000 trials of multi-path Rayleigh fading channels. Each time, channel impulse responses $h_1$ and $h_2$ are randomly generated with parameters $L=257$ and $\sigma_T=128 T_S$ according to the channel model in Section II.

First, in FIG. 11, all the schemes achieve the same performances in the degraded single-user case, which corresponds to the two overlapping intersection points on the axes. This is due to the mathematical similarity between TR and Rake receivers in the single-user case and the commutative property of linear time-invariant (LTI) system. On the other hand, in most cases when both users are active, the disclosed exemplary TRDMA scheme outperforms all the rake-receiver based schemes as shown in FIG. 11. Moreover, the frontier achieved by TRDMA is close to the Genie-aided outer-bound.

All these demonstrate the exemplary TRDMA system's unique advantage of spatial focusing brought by the pre-processing of embedding location-specific signatures before sending signals into the air. The high-resolution spatial focusing, as one of the key mechanisms of the exemplary TRDMA-based system(s), alleviates interference between users and provides a novel wireless medium access solution for multi-user communications.

V. Channel Correlation Effect

In the preceding sections, we assume a model of independent channels, because for rich-scattering multipath profiles associated with reasonably far-apart (typically, several wavelengths) locations, they are often highly uncorrelated. However, channels may become correlated when the environment is less scattering and users are very close to each other. To gain a more comprehensive understanding of TRDMA, it is also interesting and important to develop a quantitative assessment of its performance degradation due to spatial correlation between users.

A. Spatial Channel Correlation

Although there are many ways to model correlated channel responses, we herein choose to obtain correlated channel responses $\hat{X}b$ and $\hat{Y}b$ by performing element-wise linear combinations of independent channels X and Y as follows $$\begin{bmatrix} \hat{X}(i) \\ \hat{Y}(i) \end{bmatrix} = \begin{bmatrix} \sqrt{\xi} & \sqrt{1-\xi} \\ \sqrt{1-\xi} & \sqrt{\xi} \end{bmatrix} \begin{bmatrix} X(i) \\ Y(i) \end{bmatrix} \quad (42)$$

where the coefficient $\xi \in [0, 1]$.

Before we proceed, we give a definition to spatial correlation of two multi-path channel responses.

Definition 3. For two multi-path channel responses $\vec{X}$ and $\vec{Y}$, the spatial correlation of $\vec{X}$ and $\vec{Y}$ is defined as $$S_{\vec{X}\vec{Y}} = \frac{\sum_{i=0}^{L-1} |E[\vec{X}(i)\vec{Y}(i)^*]|}{\sqrt{\sum_{i=0}^{L-1} E[|\vec{X}(i)|^2] \cdot \sum_{j=0}^{L-1} E[|\vec{Y}(j)|^2]}}. \quad (43)$$

Note that this definition assumes zero-mean channel responses without loss of generality, and $S_{\vec{X}\vec{Y}}$ takes values between 0 and 1. Particularly, when $\vec{X}$ and $\vec{Y}$ are identical or additive inverse to each other, $S_{\vec{X}\vec{Y}}=1$; when $\vec{X}$ and $\vec{Y}$ are uncorrelated, $S_{\vec{X}\vec{Y}}=0$.

B. Channel Correlation Among Users

For simplicity, we look at a two-user SISO case with correlated channel responses. We observe the impact of users' spatial correlation to the system performances.

Let us consider two correlated CIRs $bh_1$ and $bh_2$ obtained from the linear combination of two independent CIRs $h_1$ and $h_2$, as shown in (42), where $h_i[k]$'s are assumed as in Section II to be independent circular symmetric complex Gaussian random variables with zero mean and variance $$E[|h_i[k]|^2] = e^{\frac{kT_S}{\sigma_T}},$$

for $0 \leq k \leq L-1$.

Then, the spatial correlation defined in (43) for $\hat{h}_1$ and $\hat{h}_2$ can be calculated by the simple form $$S_{\hat{h}_1 \hat{h}_2} = 2\sqrt{\xi(1-\xi)}. \quad (44)$$

Since the spatial correlation primarily affects the inter-user interference power, here we focus on the change of the average power of IUI as a result of channel correlations. Similar to (18), the expected value of the new IUI power $\hat{P}_{IUI}(i)$ at User i in such a two-user SISO case (i.e. N=2 and $M_T=1$) with the correlated CIRs $\hat{h}_1$ and $\hat{h}_2$ can be written as $$E[\hat{P}_{IUI}(i)] = \theta E\left[\sum_{l=0}^{\frac{2L-2}{D}} |(\hat{h}_i * \hat{g}_i)[Dl]|^2\right], j \neq i, i, j \in \{1, 2\}, \quad (45)$$

where the TRM $$g_j[k] = \hat{h}_j^*[L-1-k] / \sqrt{E\left[\sum_{l=0}^{L-1} |\hat{h}_j[l]|^2\right]}$$

corresponds to User j with the CIR $\hat{h}_j$.

A direct calculation of (45) can be tedious. However, by substituting uncorrelated $h_1$ and $h_2$ into (45) according to the linear transform (42), we can utilize the existing results in Section III and represent the expected value of $\hat{P}_{IUI}(i)$ in terms of E $[P_{Sig}(i)]$, E $[P_{ISI}(i)]$ and E $[P_{IUI}(i)]$ as follows:

$$E[\hat{P}_{IUI}(i)] = [\xi^2 + (1-\xi)^2]E[P_{IUI}(i)] + 2\xi(1-\xi) \quad , \quad (46)$$

$$\left(E[P_{Sig}(i)] + E[P_{ISI}(i)] + \theta E\left[\sum_{l=0}^{L-1} |h_i[l]|^2\right]\right)$$

$$= E[P_{IUI}(i)] + \frac{S_{\hat{h}_1\hat{h}_2}^2}{2}\bigg(E[P_{Sig}(i)] +$$

$$E[P_{ISI}(i)] - E[P_{IUI}(i)] + \theta E\left[\sum_{l=0}^{L-1} |h_i[l]|^2\right]\bigg)$$

where E $[P_{Sig}(i)]$ in (20), E $[P_{ISI}(i)]$ in (21) and E $[P_{IUI}(i)]$ in (22) are calculated with respect to uncorrelated $h_1$ and $h_2$.

Note that in (46), the second term $$\left(E[P_{Sig}(i)] + E[P_{ISI}(i)] - E[P_{IUI}(i)] + \theta E\left[\sum_{l=0}^{L-1} |h_i[l]|^2\right]\right)$$

is always positive, which is a penalty to the system performance due to the two users' spatial correlation. When $S_{\hat{h}_1\hat{h}_2}=0$ (i.e. $\xi=0$ or $\xi=1$), are un $\hat{h}_1$ and $\hat{h}_2$ correlated, and thus E $[\hat{P}_{IUI}(i)]=$ E $[\hat{P}_{IUI}(i)]$. In the extreme case when $S_{\hat{h}_1\hat{h}_2}=1$ (i.e. $\xi=0.5$) that maximizes (46), $\hat{h}_1$ and $\hat{h}_2$ are identical, the IUI achieves its upper-bound $$E[\hat{P}_{IUI}(i)] = \frac{1}{2}\left(E[P_{Sig}(i)] + E[P_{ISI}(i)] + E[P_{IUI}(i)] + \theta E\left[\sum_{l=0}^{L-1} |h_i[l]|^2\right]\right). \quad (47)$$

Since $$E[P_{Sig}(i)] + E[P_{ISI}(i)] = E[P_{IUI}(i)] + \theta E\left[\sum_{l=0}^{L-1} |h_i[l]|^2\right] \text{ at } D = 1,$$

(47) can be written as E $[\hat{P}_{IUI}(i)]=$ E $[P_{Sig}(i)]+$ E $[P_{ISI}(i)]$, when there is no rate back-off.

The impact of the increased interference would be most prominent in the high SNR regime, where the interference power dominates the noise power. So we evaluate its impact to the system performance in terms of signal-to-interference ratio (SIR), as a close approximation of the effective SINR in the high SNR regime.

FIG. 12 shows the influence of the spatial correlation to the SIR with correlated CIRs $\hat{h}_1$ and $\hat{h}_2$ of length L=257 and delay spread $\sigma_T=128$ $T_S$. As one can see in FIG. 12, the SIR degradation speed varies with different ranges of $S_{\hat{h}_1\hat{h}_2}$. In the lower range of $S_{\hat{h}_1\hat{h}_2}$ (e.g. from 0 to 0.2) the SIR degrades very slowly. Also, the larger rate backoff D tends to result in a faster performance loss due to spatial correlation as shown in FIG. 12.

However, even for $S_{\hat{h}_1\hat{h}_2}$ up to 0.5 which is rare in real-life RF communications over scattering environments, the degraded SIR is preserved within 3 dB away from the performances of uncorrelated channels. This demonstrates the robustness of the disclosed exemplary TRDMA scheme and provides a more comprehensive understanding of its system performances.

VI. Conclusion

As set forth above, a TRDMA scheme is disclosed for the multi-user downlink network over multi-path channels. Both single-antenna and multi-antenna schemes were developed to utilize the location-specific signatures that naturally exist in the multi-path environment. We defined and evaluated both analytically and numerically a variety of performance metrics of including the effective SINR, the achievable sum rate, and achievable rates with outage. We then demonstrated the TRDMA's improvement of achievable rate region over the rake receivers and investigated the impact of spatial correlations between users to the system performances. Based on the advantageous properties shown in the analysis and simulation results, the disclosed TRDMA scheme is an advantageous technique in the future energy-efficient low-complexity broadband wireless communications.

While not restricted thereto, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, while not required in all exemplary embodiments, one or more units and/or modules of the disclosed TRDMA system(s) can include a processor or microprocessor executing a computer program stored in a computer-readable medium.

While exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A time-reversal based communication system comprising:
   a transmitting section; and
   a receiving section comprising a plurality of receivers,
      wherein the transmitting section comprises:
         a communication unit configured to:
            receive asynchronously a plurality of signals respectively from the plurality of receivers of the receiving section in a channel probing phase,
               wherein each of the plurality of signals is quantized with at least one of: a 9-bit quantization, and another quantization with more than 9 bits, and
            store asynchronously a plurality of time-reversed signals corresponding to the received plurality of signals with respect to the plurality of receivers; and
         a first conversion unit configured to
            convert, by a first factor, a plurality of information sequences to be respectively transmitted to the plurality of receivers in a data transmission phase, and
            forward the plurality of converted information sequences to the communication unit,
         wherein the communication unit is configured to generate in the data transmission phase, based on the plurality of converted information sequences and based on the stored plurality of time-reversed signals, a plurality of output signals to be transmitted to the plurality of receivers,
            wherein each of the plurality of the output signals to include a location-specific signature unique to the corresponding receiver based on a respective time-reversed signal, and
         a combiner, for combining at least two output signals to be transmitted jointly by a transmit antenna,
      wherein a respective receiver of the plurality of receivers of the receiving section comprises:
         an adjustment unit configured to perform a gain adjustment, in response to receiving a respective output signal, to the output signal, and
         a second conversion unit configured to convert, by the first factor, the gain-adjusted output signal thereby generating a version of a respective information sequence transmitted from the transmitting section to the receiver.

2. The time-reversal based communication system of claim 1, wherein the communication unit is configured to:
   convolve a respective converted information sequence for the respective receiver and a respective time-reversed signal for the respective receiver to obtain the respective output signal, and
   add the respective output signal to a sum of the plurality of output signals to be transmitted jointly to the plurality of receivers as a combined output signal to be transmitted by the transmit antenna.

3. The time-reversal based communication system of claim 1, wherein the communication system is a time-reversal division multiple access (TRDMA) communication system.

4. The time-reversal based communication system of claim 1, wherein the communication unit is a time-reversal mirror configured to:
   receive asynchronously in the channel probing phase, as the signals, a plurality of impulse signals respectively from the plurality of receivers of the receiving section,
   record asynchronously a plurality of channel responses of the received plurality of impulse signals with respect to the plurality of receivers, and
   store asynchronously a plurality of time-reversed versions of the plurality of channel responses as the plurality of time-reversed signals corresponding to the received plurality of impulse signals with respect to the plurality of receivers.

5. The time-reversal based communication system of claim 1:
   wherein the first conversion unit is configured to convert the plurality of information sequences by up-sampling the plurality of information sequences by the first factor, and
   wherein the second conversion unit is configured to convert the gain-adjusted output signal by down-sampling the gain-adjusted output signal by the first factor.

6. A time-reversal based transmission system comprising:
   a communication unit configured to:
      receive asynchronously, in a channel probing phase, a plurality of signals respectively from a plurality of broadband receivers,
         wherein each of the plurality of signals is quantized with at least one of: a 9-bit quantization and another quantization with more than 9 bits, and
      store asynchronously a plurality of time-reversed signals corresponding to the asynchronously received plurality of signals with respect to the plurality of receivers; and
   a first conversion unit configured to:
      re-sample by a first factor, in a data transmission phase, a plurality of information sequences to be respectively transmitted to the plurality of receivers and
      forward the plurality of re-sampled information sequences to the communication unit,
   wherein the communication unit is configured to:
      generate a plurality of output signals, in the data transmission phase, based on the plurality of converted information sequences and based on the plurality of stored time-reversed signals, and
      respectively transmit the plurality of output signals to the plurality of receivers,
         wherein each of the plurality of the output signals to include a location-specific signature unique to the corresponding receiver based on a respectively time-reversed signal, and
   a combiner to combine at least two output signals to be transmitted jointly by a transmit antenna,
   wherein a respective receiver of the plurality of receivers to comprise:
      an adjustment unit configured to perform a gain adjustment, in response to receiving a respective output signal from the communication unit by the respective receiver, to the output signal, and
      a second conversion unit configured to re-sample, by the first factor, the gain-adjusted output signal thereby generating a version of a respective information sequence transmitted from the communication unit to the receiver.

7. The time-reversal based transmission system of claim 6, wherein the communication unit is configured to:

convolve a respective converted information sequence of the respective receiver and a respective time-reversed signal for the respective receiver to obtain the respective output signal, and add the respective output signal to a sum of the plurality of output signals to be transmitted jointly to the plurality of receivers as a combined output signal to be transmitted by the transmit antenna.

8. The time-reversal based transmission system of claim 6, wherein the transmission system employs a time-reversal division multiple access (TRDMA) transmission scheme.

9. The time-reversal based transmission system of claim 6, wherein the communication unit is a time-reversal mirror configured to:

receive asynchronously in the channel probing phase, as the plurality of signals, a plurality of impulse signals respectively from the plurality of receivers, record asynchronously a plurality of channel responses of the received plurality of impulse signals with respect to the plurality of receivers, and store asynchronously a plurality of time-reversed versions of the plurality of channel responses as the plurality of time-reversed signals corresponding to the received plurality of impulse signals with respect to the plurality of receivers.

10. The time-reversal based transmission system of claim 6:

wherein the first conversion unit is configured to re-sample the plurality of information sequences by up-sampling the plurality of information sequences by the first factor, and wherein the second conversion unit is configured to re-sample the gain-adjusted output signal by down-sampling the gain-adjusted output signal by the first factor.

11. A time-reversal based transmission method comprising:

storing asynchronously a plurality of time-reversed signals corresponding to a plurality of signals respectively received asynchronously from a plurality of receivers wherein each of the plurality of signals is quantized with at least one of: a 9-bit quantization and another quantization with more than 9 bits;

converting in a data transmission phase, by a first factor, at least one information sequence to be respectively transmitted to the plurality of receivers; and generating in the data transmission phase, based on the at least one converted information sequence and based on the stored plurality of time-reversed signals, at least one output signal to be respectively combined by a combiner and to be transmitted by a transmit antenna to the plurality of receivers, each of the plurality of the output signals including a location-specific signature unique to the corresponding receiver based on a respective time-reversed signal.

12. The time-reversal based transmission method of claim 11, wherein the generating comprises:

convolving a respective converted information sequence for a respective receiver and a respective time-reversed signal for the respective receiver to obtain a respective output signal, and adding the respective output signal to a sum of the at least one output signal to be transmitted jointly to the plurality of receivers as a combined output signal to be transmitted.

13. The time-reversal based transmission method of claim 11, wherein the time-reversal based transmission method is implemented by a time-reversal division multiple access (TRDMA) transmission scheme.

14. The time-reversal based transmission method of claim 11, further comprising:

receiving asynchronously in the channel probing phase, as the plurality of signals, a plurality of impulse signals respectively from the plurality of receivers; and recording asynchronously a plurality of channel responses of the received plurality of impulse signals with respect to the plurality of receivers, wherein the storing comprises storing asynchronously a plurality of time-reversed versions of the plurality of channel responses as the plurality of time-reversed signals corresponding to the received plurality of impulse signals with respect to the plurality of receivers.

15. The time-reversal based transmission method of claim 11, wherein the converting at least one information sequence comprises up-sampling the at least one information sequence by the first factor.

16. A non-transitory computer-readable medium storing a program to execute functions of a time-reversal based transmission method using a processor communicatively coupled with the non-transitory computer-readable medium, the functions comprising:

storing asynchronously in a channel probing phase a plurality of time-reversed signals corresponding to a plurality of signals respectively received asynchronously from a plurality of receivers, wherein each of the plurality of signals is quantized with at least one of: a 9-bit quantization and another quantization with more than 9 bits;

converting in a data transmission phase, by a first factor, at least one information sequence to be respectively transmitted to the plurality of receivers; and generating in the data transmission phase, based on the at least one converted information sequence and based on the stored plurality of time-reversed signals, at least one output signals to be respectively combined by a combiner and to be transmitted by a transmit antenna to the plurality of receivers, each of the plurality of the output signals including a location-specific signature unique to the corresponding receiver based on a respectively time-reversed signal.

17. The non-transitory computer-readable medium of claim 16, wherein the generating comprises:

convolving a respective converted information sequence for a respective receiver and a respective time-reversed signal for the respective receiver to obtain a respective output signal, and adding the respective output signal to a sum of the at least one output signal to be transmitted jointly to the plurality of receivers as a combined output signal to be transmitted.

18. The non-transitory computer-readable medium of claim 16, wherein the time-reversal based transmission method is implemented by a time-reversal division multiple access (TRDMA) transmission scheme.

19. The non-transitory computer-readable medium of claim 16, wherein the functions further comprise:

receiving asynchronously in the channel probing phase, as the plurality of signals, a plurality of impulse signals respectively from the plurality of receivers; and recording asynchronously a plurality of channel responses of the received plurality of impulse signals with respect to the plurality of receivers, wherein the storing comprises storing asynchronously a plurality of time-reversed versions of the plurality of channel responses as the plurality of time-reversed signals corresponding to the received plurality of impulse signals with respect to the plurality of receivers.

20. The non-transitory computer-readable medium of claim 16, wherein the converting at least one information sequence comprises up-sampling the at least one information sequence by the first factor.

* * * * *